(12) United States Patent
Lum et al.

(10) Patent No.: US 12,673,416 B2
(45) Date of Patent: Jul. 7, 2026

(54) MAGNETIC MINIATURE ROBOTS

(71) Applicant: NANYANG TECHNOLOGICAL UNIVERSITY, Singapore (SG)

(72) Inventors: Guo Zhan Lum, Singapore (SG); Changyu Xu, Singapore (SG); Zilin Yang, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 483 days.

(21) Appl. No.: 18/099,184

(22) Filed: Jan. 19, 2023

(65) Prior Publication Data

US 2023/0330841 A1 Oct. 19, 2023

(30) Foreign Application Priority Data

Apr. 19, 2022 (SG) .......................... 10202204044R
May 24, 2022 (SG) .......................... 10202205530Q

(51) Int. Cl.
| | |
|---|---|
| *B25J 9/12* | (2006.01) |
| *B25J 9/00* | (2006.01) |
| *H01F 13/00* | (2006.01) |

(52) U.S. Cl.
CPC ............... *B25J 9/12* (2013.01); *B25J 9/0015* (2013.01); *H01F 13/003* (2013.01)

(58) Field of Classification Search
CPC .... B25J 9/12; B25J 9/0015; B25J 7/00; H01F 13/003; H01F 7/0215
See application file for complete search history.

(56) References Cited

U.S. PATENT DOCUMENTS 9,281,112 B2 * 3/2016 Sitti ......................... F04D 29/02
2013/0169393 A1 * 7/2013 Dieny ..................... B82Y 25/00
427/127
(Continued)

FOREIGN PATENT DOCUMENTS

CN 110843163 A * 2/2020 ............. A61B 34/30
EP 3 954 531 A1 2/2022

OTHER PUBLICATIONS

Diller E., et.al., Six-Degrees-of-Freedom Remote Actuation of Magnetic Microrobots, The International Journal of Robotics Research, vol. 35, Issue 1-3, Jan. 2016 (Year: 2016).*
(Continued)

*Primary Examiner* — Thomas J Hong
*Assistant Examiner* — Jose K Abraham
(74) *Attorney, Agent, or Firm* — Nixon & Vanderhye P.C.

(57) ABSTRACT

A method of making a magnetic miniature robot includes: rotationally deforming a segment of material about a rotational deformation axis, from an initial shape to a deformed shape, the material including a plurality of magnetic particles distributed in an elastic matrix; magnetizing the plurality of magnetic particles in the segment to form a magnetized segment in a magnetization process, in the magnetized segment in the deformed shape being characterized by a uniform magnetization profile; after the magnetization process, enabling the magnetized segment to elastically recover the initial shape and form a non-uniform magnetization profile; and coupling together at least one pair of the segment to form a main component, wherein the non-uniform magnetization profiles of the at least one pair of the segment are disposed in opposing orientations to configure the main component with a zero net magnetic moment about a sixth degree-of-freedom axis.

9 Claims, 16 Drawing Sheets

(56) References Cited

U.S. PATENT DOCUMENTS

2018/0354120 A1* 12/2018 Diller .................... B81C 99/002
2020/0066963 A1*  2/2020 Johnson ............... H10N 30/852

OTHER PUBLICATIONS

A. J. Petruska, "Open-loop orientation control using dynamic magnetic fields," IEEE Robotics and Automation Letters 5, pp. 5472-5476. (2020).

A. W. Mahoney, J. J. Abbott, "Five-degree-of-freedom manipulation of an untethered magnetic device in fluid using a single permanent magnet with application in stomach capsule endoscopy," The International Journal of Robotics Research 35, pp. 129-147. (2016).

C. Huang, Z. Lai, L. Zhang, X. Wu, T. Xu, "A magnetically controlled soft miniature robotic fish with a flexible skeleton inspired by zebrafish," Bioinspiration & Biomimetics 16 (2021), 065004 (2021), pp. 1-10.

C. Pauer, O. Du Roure, J. Heuvingh, T. Liedl, J. Tavacoli, "Programmable design and performance of modular magnetic microswimmers," Advanced Materials 33, 2006237 (2021), 9 pages.

C. R. Thornley, L. N. Pham, J. J. Abbott, "Reconsidering Six-Degree-of-Freedom Magnetic Actuation Across Scales," IEEE Robotics and Automation Letters, vol. 4, No. 3, Jul. 2019, pp. 2325-2332.

C. Xu, Z. Yang, G. Z. Lum, "Small-scale magnetic actuators with optimal six degrees-of-freedom," Advanced Materials 33, 2100170 (2021), 15 pages.

D. R. Frutiger, K. Vollmers, B. E. Kratochvil, B. J. Nelson, "Small, fast, and under control: wireless resonant magnetic micro-agents," The International Journal of Robotics Research, vol. 29, No. 5, Apr. 2010, pp. 613-636.

D. Son, M. C. Ugurlu, M. Sitti, "Permanent magnet array-driven navigation of wireless millirobots inside soft tissues," Science Advances 7, eabi8932, Oct. 20, 2021, 11 pages.

D. Wang et al., "An untethered crawling and jumping micro-robot,". 2021 21st International Conference on Solid-State Sensors, Actuators and Microsystems (Transducers) (IEEE), Transducers Virtual Conference, Jun. 20-24, 2021, pp. 353-356.

D. Wong, E. B. Steager, V. Kumar, "Independent control of identical magnetic robots in a plane," IEEE Robotics and Automation Letters, vol. 1, No. 1, Jan. 2016, pp. 554-561. (2016).

Diller et al, "Six-degree-of-freedom magnetic actuation for wireless microrobotics," The International Journal of Robotics Research, vol. 35(1-3), DOI: 10.1177/0278364915583539, 2016, pp. 114-128.

E. Al Khatib, A. Bhattacharjee, p. Razzaghi, L. W. Rogowski, M. J. Kim, Y. Hurmuzlu, "Magnetically actuated simple millirobots for complex navigation and modular assembly," IEEE Robotics and Automation Letters, vol. 5, No. 2, Apr. 2020, pp. 2958-2965.

E. B. Steager, D. Wong, D. Mishra, R. Weiss, V. Kumar, "Sensors for Micro Bio Robots via Synthetic Biology," 2014 IEEE Int. Conf. Robotics and Automation (ICRA), IEEE, Piscataway, NJ, USA, https://doi.org/10.1109/ICRA.2014.6907407, May 31-Jun. 7, 2014, pp. 3783-3788.

E. D. Diller, J. Giltinan, G. Z. Lum, Z. Ye, M. Sitti, "Six-degrees-of-freedom remote actuation of magnetic microrobots," Robotics: Science and Systems (RSS). DOI: 10.15607/RSS.2014.X.013, 2014, 9 pages.

E. Diller, C. Pawashe, S. Floyd, M. Sitti, "Assembly and disassembly of magnetic mobile micro-robots towards deterministic 2-D reconfigurable micro-systems," The International Journal of Robotics Research, 30(14), 2011, pp. 1667-1680.

E. Diller, J. Zhuang, G. Z. Lum, M. R. Edwards, M. Sitti, "Continuously distributed magnetization profile for millimeter-scale elastomeric undulatory swimming," Applied Physics Letters 104, 174101, Published Apr. 29, 2014, 5 pages.

E. Diller, M. Sitti, "Three-dimensional programmable assembly by untethered magnetic robotic micro-grippers," Advanced Functional Materials, vol. 24, , 2014, pp. 4397-4404.

E. Diller, S. Floyd, C. Pawashe, M. Sitti, "Control of multiple heterogeneous magnetic microrobots in two dimensions on nonspecialized surfaces," IEEE Transactions on Robotics, vol. 28, No. 1, Feb. 2012, pp. 172-182.

E. Diller, S. Miyashita, M. Sitti, "Remotely addressable magnetic composite micropumps," RSC Advances, The Royal Society of Chemistry, vol. 2, 2012, pp. 3850-3856.

G. Z. Lum et al., "Shape-programmable magnetic soft matter," Proceedings of the National Academy of Sciences 113, Sep. 26, 2016, pp. E6007-E6015.

H. Ceylan N.O. Dogan, I. C. Yasa, M. N. Musaoglu, Z. U. Kulali, M. Sitti, "3D printed personalized magnetic micromachines from patient blood-derived biomaterials," Science Advances 2021, eabh0273, Sep. 23, 2021, 11 pages.

H. Gu, Q. Boehler, H. Cui, E. Secchi, G. Savorana, C. De Marco, S. Gervasoni, Q. Peyron, T.-Y. Huang, S. Pane, A. Hirt, D. Ahmed, B. J. Nelson, Magnet Cilia Carpets with Programmable Metachronal Waves, Nature Communications, 2020, 10 pages.

H.-W. Huang, F. E. Uslu, P. Katsamba, E. Lauga, M. S. Sakar, B. J. Nelson, "Adaptive locomotion of artificial microswimmers." Science Advances 5, eaau1532, Jan. 18, 2019, 8 pages.

I. S. Khalil et al., "Independent actuation of two-tailed microrobots," IEEE Robotics and Automation Letters, vol. 3, No. 3, Jul. 2018, pp. 1703-1710.

I. S. Khalil et al., "Mechanical rubbing of blood clots using helical robots under ultrasound guidance," IEEE Robotics and Automation Letters, vol. 3, No. 2, Apr. 2018, pp. 1112-1119.

J. Cui et al., "Nanomagnetic encoding of shape-morphing micromachines," Nature, vol. 575, Nov. 7, 2019, 19 pages.

J. Giltinan, E. Diller, M. Sitti, "Programmable assembly of heterogeneous microparts by an untethered mobile capillary microgripper," Lab on a Chip, 16, The Royal Society of Chemistry, 2016, pp. 4445-4457.

J. Giltinan, M. Sitti, "Simultaneous six-degree-of-freedom control of a single-body magnetic microrobot," IEEE Robotics and Automation Letters, vol. 4, No. 2, Apr. 2019, pp. 508-514.

J. Kim, S. E. Chung, S.-E. Choi, H. Lee, J. Kim, S. Kwon, "Programming magnetic anisotropy in polymeric microactuators," Nature Materials, vol. 10, Oct. 2011, pp. pp. 747-752.

J. Zhang et al., "Voxelated three-dimensional miniature magnetic soft machines via multimaterial heterogeneous assembly," Science Robotics 6, eabf0112, Apr. 28, 2021, 15 pages.

J. Zhang, E. Diller, Millimeter-scale magnetic swimmers using elastomeric undulations, 2015 IEEE/RSJ International Conference on Intelligent Robots and Systems (IROS), Sep. 28-Oct. 2, 2015, pp. 1706-1711.

J. Zhang, E. Diller, "Untethered miniature soft robots: modeling and design of a millimeter-scale swimming magnetic sheet," Soft Robotics, vol. 5, No. 6, 2018, pp. 761-776.

J. Zhang, M. Salehizadeh, E. Diller, "Parallel pick and place using two independent untethered mobile magnetic microgrippers," 2018 IEEE International Conference on Robotics and Automation (ICRA), May 21-25, 2018, pp. 123-128.

J. Zhang, O. Onaizah, K. Middleton, L. You, E. Diller, "Reliable grasping of three-dimensional untethered mobile magnetic microgripper for autonomous pick-and-place," IEEE Robotics and Automation Letters, vol. 2, No. 2, Apr. 2017, pp. 835-840.

J. Zhang, P. Jain, E. Diller, "Independent control of two millimeter-scale softbodied magnetic robotic swimmers," 2016 IEEE International Conference on Robotics and Automation (ICRA), May 16-21, 2016, pp. 1933-1938.

J. Zhang, Y. Guo, W. Hu, R. H. Soon, Z. S. Davidson, M. Sitti, "Liquid crystal elastomer-based magnetic composite films for reconfigurable shape-morphing soft miniature machines," Advanced Materials 2021, 33, 2006191, 9 pages.

K. T. Nguyen et al., "A magnetically guided self-rolled microrobot for targeted drug delivery, real-time X-Ray imaging, and microrobot retrieval," Advanced Healthcare Materials, 10, 2001681, 2021, 14 pages.

L. S. Novelino, Q. Ze, S. Wu, G. H. Paulino, R. Zhao, "Untethered control of functional origami microrobots with distributed actuation," Proceedings of the National Academy of Sciences, vol. 117, No. 39, Sep. 29, 2020, pp. 24096-24101.

(56)　　　　　References Cited

OTHER PUBLICATIONS

L. Wang, Y. Kim, C. F. Guo, X. Zhao, "Hard-magnetic elastica," Journal of the Mechanics and Physics of Solids 142, (2020), 17 pages.

L. Zhang, J. J. Abbott, L. Dong, B. E. Kratochvil, D. Bell, B. J. Nelson, "Artificial bacterial flagella: fabrication and magnetic control," Applied Physics Letters 94, 064107, (2009), 4 pages.

M. P. Kummer, J. J. Abbott, B. E. Kratochvil, R. Borer, A. Sengul, B. J. Nelson, "OctoMag: an electromagnetic system for 5-DOF wireless micromanipulation," IEEE Transactions on Robotics, vol. 26, No. 6, Dec. 2010, pp. 6, pp. 1006-1017.

M. S. Sakar, E. B. Steager, D. H. Kim, M. J. Kim, G. J. Pappas, V. Kumar, "Single cell manipulation using ferromagnetic composite microtransporters," Applied Physics Letters 96, 043705, (2010), 4 pages.

M. Salehizadeh, E. Diller, "Three-dimensional independent control of multiple magnetic microrobots via inter-agent forces," The International Journal of Robotics Research, vol. 39(12), (2020), pp. 1377-1396.

M. Xie et al., "Bioinspired soft microrobots with precise magneto-collective control for microvascular thrombolysis," Advanced Materials 32, 2000366, (2020), 11 pages.

P. Cabanach, A. Pena-Francesch, D. Sheehan, U. Bozuyuk, O. Yasa, S. Borros, M. Sitti, "Zwitterionic 3D-Printed Non-Im-munogenicStealth Microrobots," Advanced Materials, 32, 2003013, (2020) 11 pages.

P. Vartholomeos, M. R. Akhavan-Sharif, P. E. Dupont, "Motion planning for multiple millimeter-scale magnetic capsules in a fluid environment," 2012 IEEE International Conference on Robotics and Automation, May 14-18, 2022, pp. 1927-1932.

Q. Ze et al., "Magnetic shape memory polymers with integrated multifunctional shape manipulation," Advanced Materials 32, 1906657, (2020), 8 pages.

R. Zhao, Y. Kim, S. A. Chester, p. Sharma, X. Zhao, "Mechanics of hard-magnetic soft materials," Journal of the Mechanics and Physics of Solids, 124, (2019), pp. 244-263.

S. E. Chung, X. Dong, M. Sitti, "Three-dimensional heterogeneous assembly of coded microgels using an untethered mobile microgripper," Lab on a Chip, vol. 15, No. 7, Apr. 7, 2015, pp. 1667-1676.

S. Jeon et al., "Magnetically actuated microrobots as a platform for stem cell transplantation," Science Robotics 4, eaav4317, May 29, 2019, 12 pages.

S. Kim et al., "Fabrication and characterization of magnetic microrobots for three-dimensional cell culture and targeted transportation," Advanced Materials, 25, pp. 5863-5868.

S. O. Demir, U. Culha, A. C. Karacakol, A. Pena-Francesch, S. Trimpe, M. Sitti, "Task space adaptation via the learning of gait controllers of magnetic soft millirobots," The International Journal of Robotics Research 2021, DOI: 10.1177/02783649211021869, vol. 40(12-14), (2021)pp. 1331-1351.

S. R. Goudu, I. C. Yasa, X. Hu, H. Ceylan, W. Hu, M. Sitti, "Biodegradable untethered magnetic hydrogel milli-grippers," Advanced Functional Materials, 30, 2004975, (2020), 10 pages.

S. Tasoglu, E. Diller, S. Guven, M. Sitti, U. Demirci, "Untethered micro-robotic coding of three-dimensional material composition," Nature Communications 5:3124, 2014, pp. 1-9.

S. Tottori, B. J. Nelson, Controlled propulsion of two-dimensional microswimmers in a precessing magnetic field, Small 14, 1800722, (2018), 7 pages.

S. Tottori, L. Zhang, F. Qiu, K. K. Krawczyk, A. Franco-Obregón, B. J. Nelson, "Magnetic helical micromachines: fabrication, controlled swimming, and cargo transport," Advanced Materials 24, (2012), pp. 811-816.

S. Wu, C. M. Hamel, Q. Ze, F. Yang, H. J. Qi, R. Zhao, "Evolutionary algorithm-guided voxel-encoding printing of functional hard-magnetic soft active materials," Advanced Intelligent Systems 2, 2000060, (2020), 10 pages.

T. Qiu et al., "Swimming by reciprocal motion at low Reynolds number," Nature Communications 5, Nov. 4, 2014, 8 pages.

T. Wang, Z. Ren, W. Hu, M. Li, M. Sitti, "Effect of body stiffness distribution on larval fish-like efficient undulatory swimming," Science Advances 7, eabf7364, May 5, 2021, 13 pages.

T. Xu, J. Zhang, M. Salehizadeh, O. Onaizah, E. Diller, "Millimeter-scale flexible robots with programmable three-dimensional magnetization and motions," Science Robotics 4, eaav4494, Apr. 24, 2019, 13 pages.

T. Zhong, F. Wei, "A jumping soft robot driven by magnetic field," International Conference on Intelligent Robotics and Applications (Springer), ICIRA 2021, pp. 267-274.

U. Culha, S. O. Demir, S. Trimpe, M. Sitti, "Learning of sub-optimal gait controllers for magnetic walking soft millirobots," Robotics Science and Systems (RSS). DOI: 10.15607/RSS.2020. XVI.070, Jul. 12-16, 2020, 9 pages.

V. Iacovacci, G. Lucarini, L. Ricotti, P. Dario, P. E. Dupont, A. Menciassi, "Untethered magnetic millirobot for targeted drug delivery," Biomedical Microdevices 17: 63, (2015), 12 pages.

V. K. Venkiteswaran, D. K. Tan, S. Misra, "Tandem actuation of legged locomotion and grasping manipulation in soft robots using magnetic fields," Extreme Mechanics Letters 41, 101023, Oct. 10, 2020, 11 pages.

W. Hu, G. Z. Lum, M. Mastrangeli, M. Sitti, "Small-scale soft-bodied robot with multimodal locomotion," Nature, vol. 554, Feb. 1, 2018, pp. 81-85.

X. Dong et al., "Bioinspired cilia arrays with programmable non-reciprocal motion and metachronal coordination," Science Advances 6, eabc9323, Nov. 6, 2020, 14 pages.

X. Dong, M. Sitti, Planning Spin-Walking Locomotion for Automatic Grasping of Microobjects by An Untethered Magnetic Microgripper, 2017 IEEE International Conference on Robotics and Automation (ICRA), IEEE, May 29-Jun. 3, 2017, pp. 6612-6618.

X. Du et al., "Reconfiguration, camouflage, and color-shifting for bioinspired adaptive hydrogel-based millirobots," Advanced Functional Materials 30, 1909202, (2020), 10 pages.

Hu et al., "Magnetic soft micromachines made of linked microactuator networks," Science Advances 7, eabe8436, Jun. 4, 2021, 10 pages.

X. Kuang et al., "Magnetic dynamic polymers for modular assembling and reconfigurable morphing architectures," Advanced Materials 33, 2102113, (2021), 12 pages.

X. Yang et al., "An agglutinate magnetic spray transforms inanimate objects into millirobots for biomedical applications," Science Robotics 5, eabc8191, Nov. 18, 2020, 13 pages.

Xu, C., Yang, Z., Tan, S.W.K., Li, J. and Lum, G.Z. (2022), "Magnetic Miniature Actuators with Six-Degrees-of-Freedom Multimodal Soft-Bodied Locomotion," Advanced Intelligent Systems, 4: 2100259, 2022, 14 pages.

Y. Alapan, A. C. Karacakol, S. N. Guzelhan, I. Isik, M. Sitti, "Reprogrammable shape morphing of magnetic soft machines," Science Advances 6, eabc6414, Sep. 18, 2020, 10 pages.

Y. Ju et al., "Reconfigurable magnetic soft robots with multimodal locomotion," Nano Energy 87, 106169, Online: May 21, 2021, 9 pages.

Y. Kim, G. A. Parada, S. Liu, X. Zhao, "Ferromagnetic soft continuum robots," Science Robotics 4, eaax7329, Aug. 28, 2019, 16 pages.

Y. Kim, H. Yuk, R. Zhao, S. A. Chester, X. Zhao, "Printing ferromagnetic domains for untethered fast-transforming soft materials," Nature, vol. 558, Jun. 14, 2018, pp. 274-279.

Z. Ren et al., "Soft-bodied adaptive multimodal locomotion strategies in fluid-filled confined spaces," Science Advances 7, eabh2022, Jun. 30, 2021, 16 pages.

Z. Ren, T. Wang, W. Hu, M. Sitti, A magnetically-actuated untethered jellyfish-inspired soft milliswimmer, Robotics: Science and Systems, DOI: 10.15607/RSS.2019.XV.013, Jun. 22-26, 2019, 8 pages.

Z. Ren, W. Hu, X. Dong, M. Sitti, "Multi-functional soft-bodied jellyfish-like swimming," Nature Communications 10, (2019), pp. 1-12.

Z. Wu et al., "A swarm of slippery micropropellers penertrates the vitreous body of the eye," Science Advances 4, eaat4388, Nov. 2, 2018, 11 pages.

(56) References Cited

OTHER PUBLICATIONS

Z. Ye, M. Sitti, "Dynamic trapping and two-dimensional transport of swimming microorganisms using a rotating magnetic microrobot," Lab on a Chip 14, (2014), pp. 2177-2182.

* cited by examiner

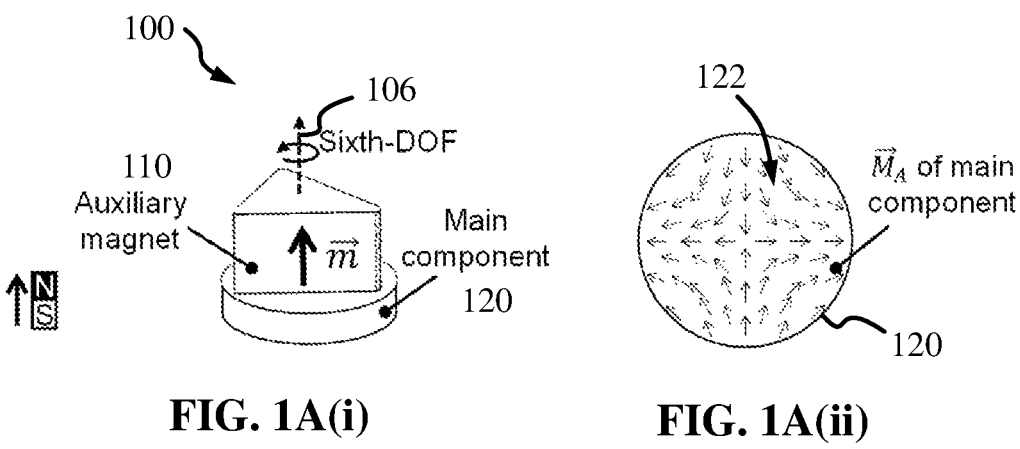
FIG. 1A(i)          FIG. 1A(ii)
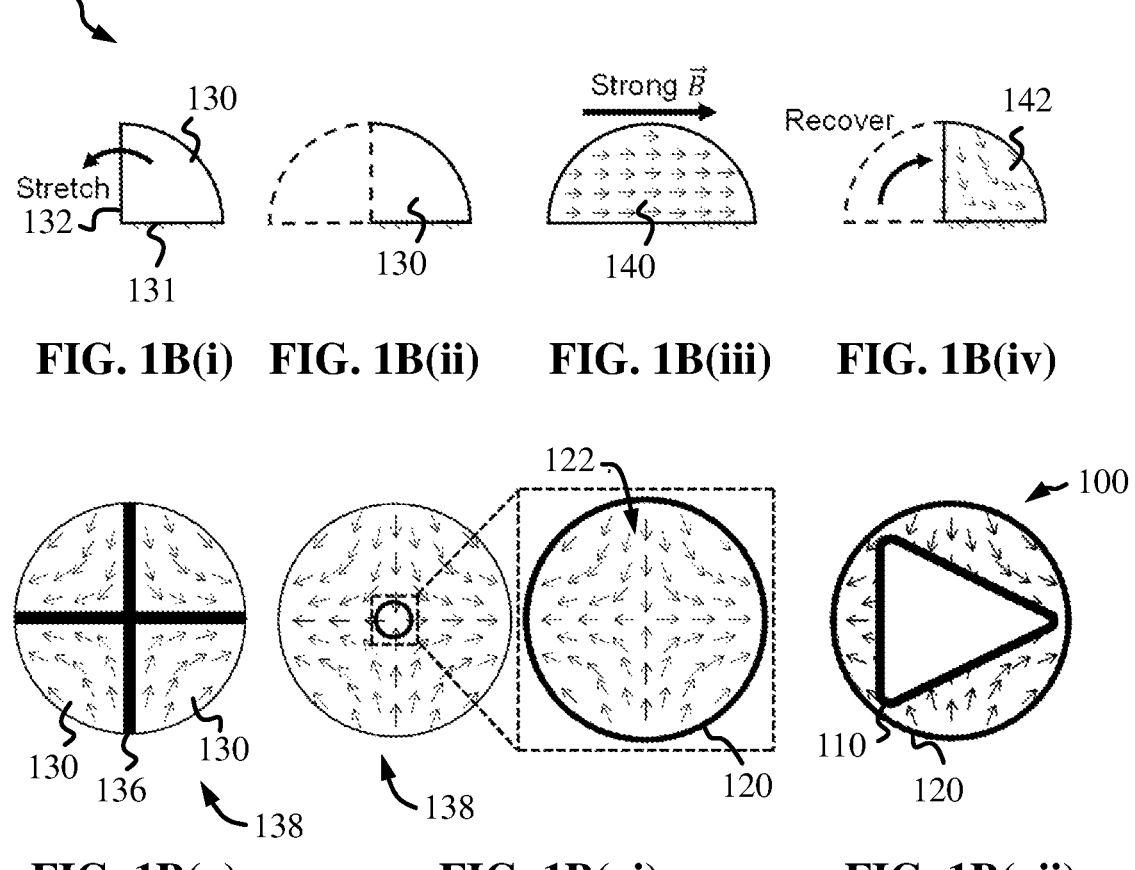
FIG. 1B(i)   FIG. 1B(ii)   FIG. 1B(iii)   FIG. 1B(iv)
FIG. 1B(v)          FIG. 1B(vi)          FIG. 1B(vii)

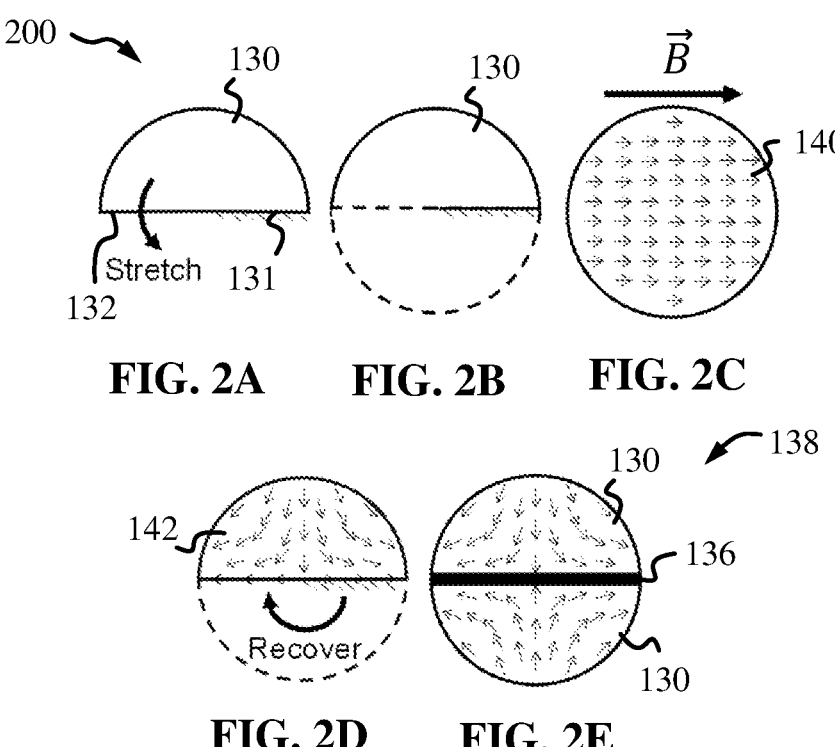
FIG. 2A          FIG. 2B          FIG. 2C
FIG. 2D          FIG. 2E
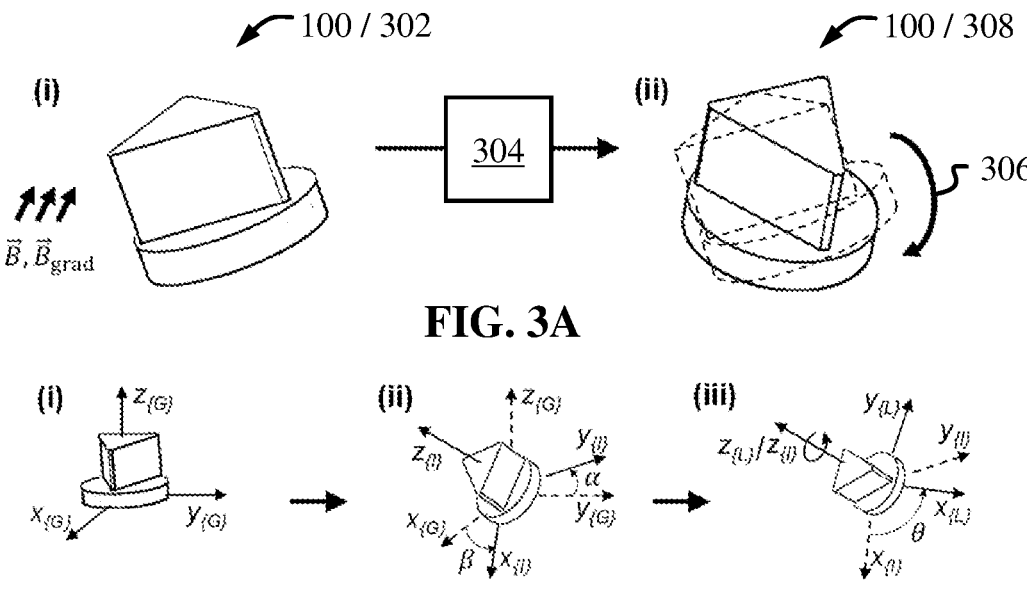
FIG. 3A
FIG. 3B

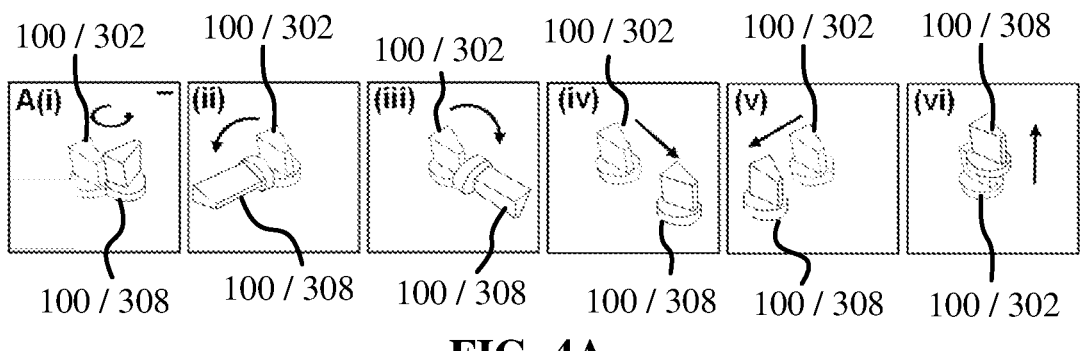
FIG. 4A
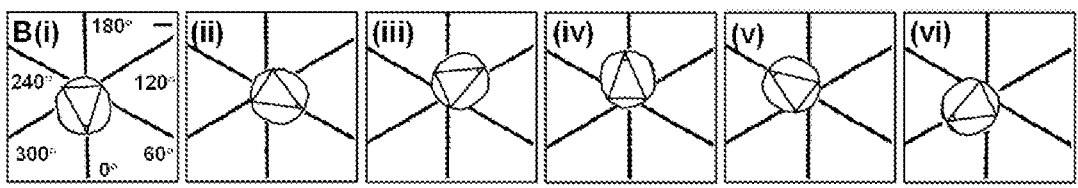
FIG. 4B
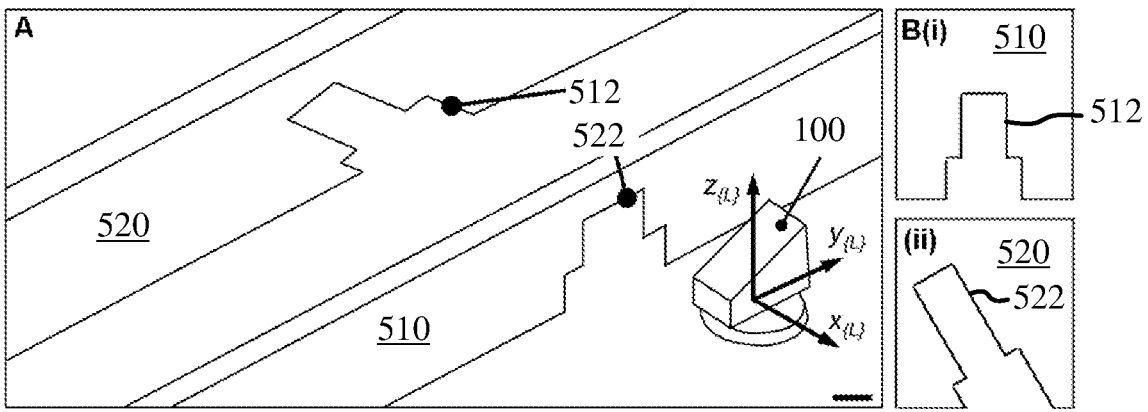
FIG. 5A  FIG. 5B
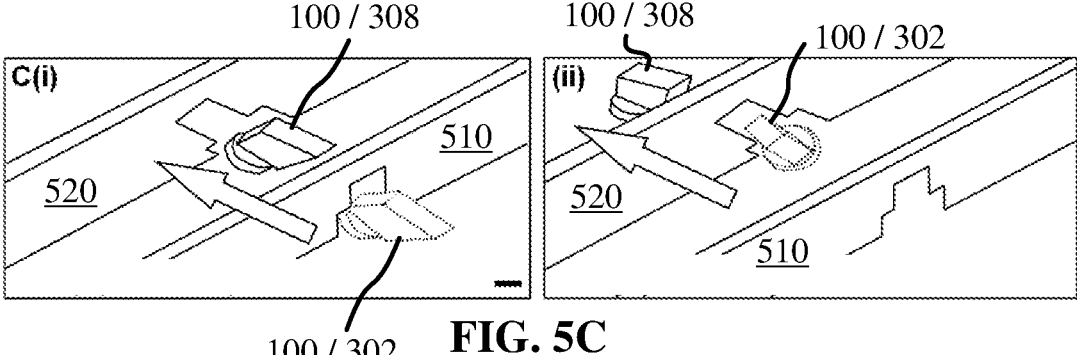
FIG. 5C

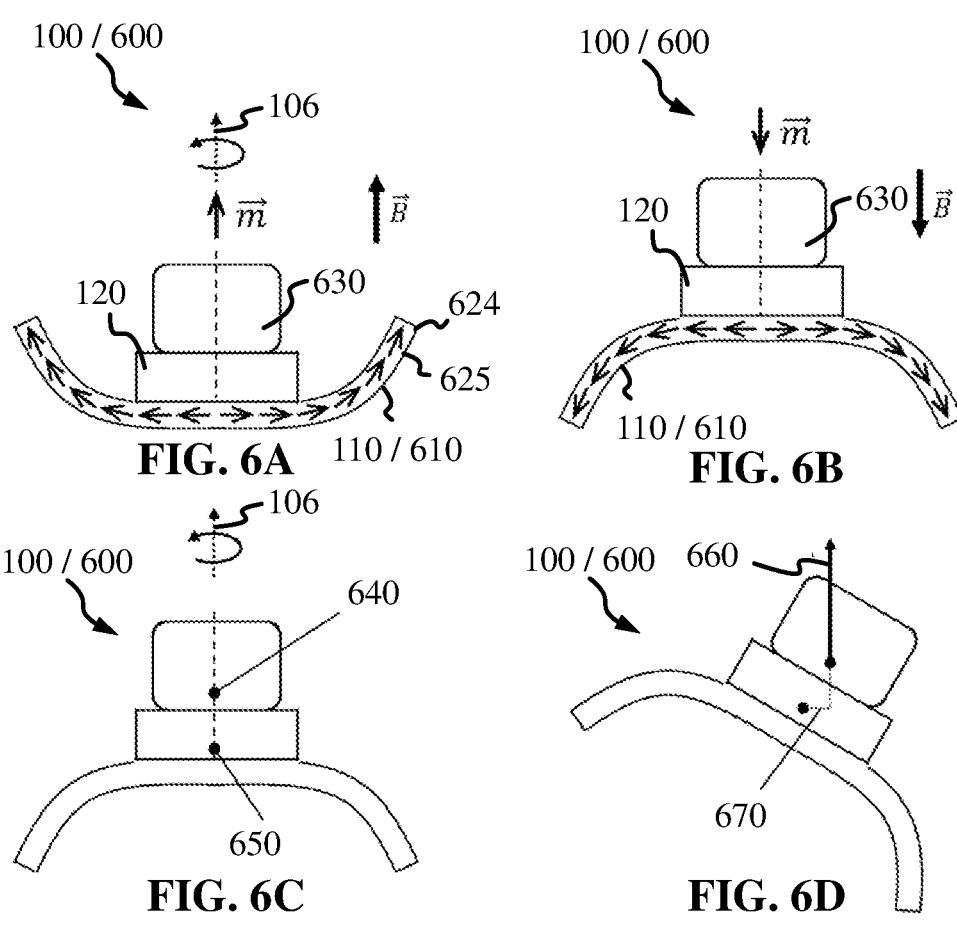
FIG. 6A
FIG. 6B
FIG. 6C
FIG. 6D
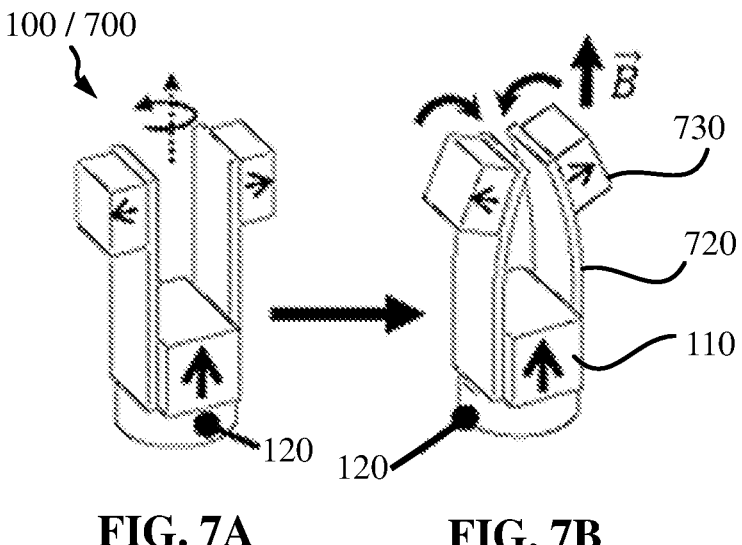
FIG. 7A          FIG. 7B

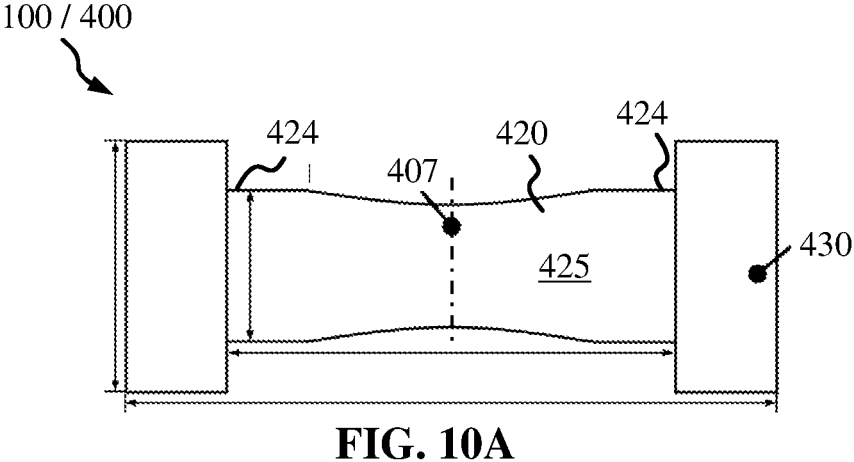
FIG. 10A
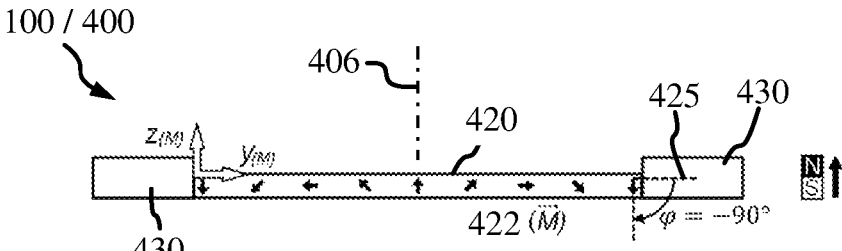
FIG. 10B
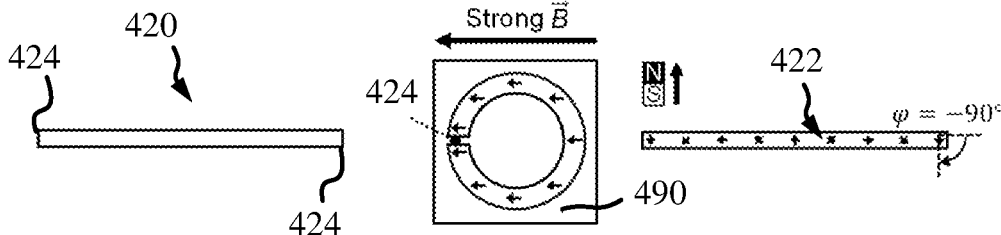
FIG. 11A          FIG. 11B          FIG. 11C

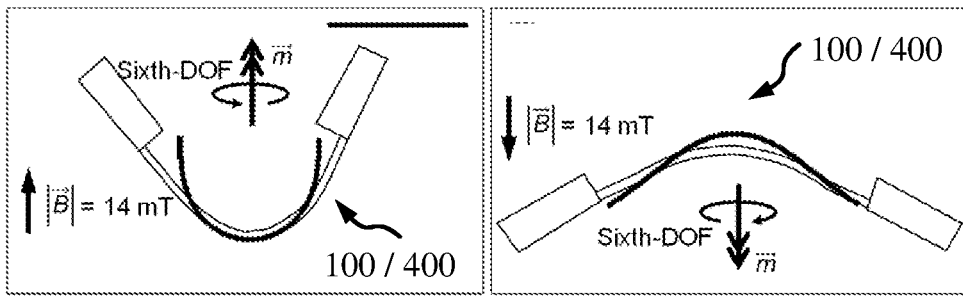
FIG. 12A(i)                         FIG. 12A(ii)
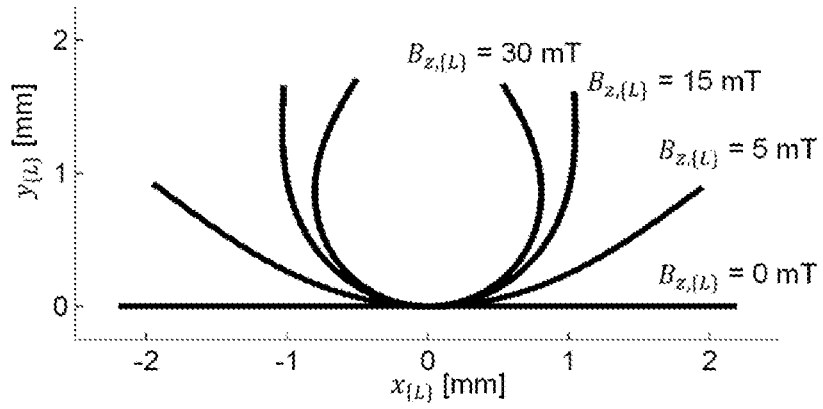
FIG. 12B
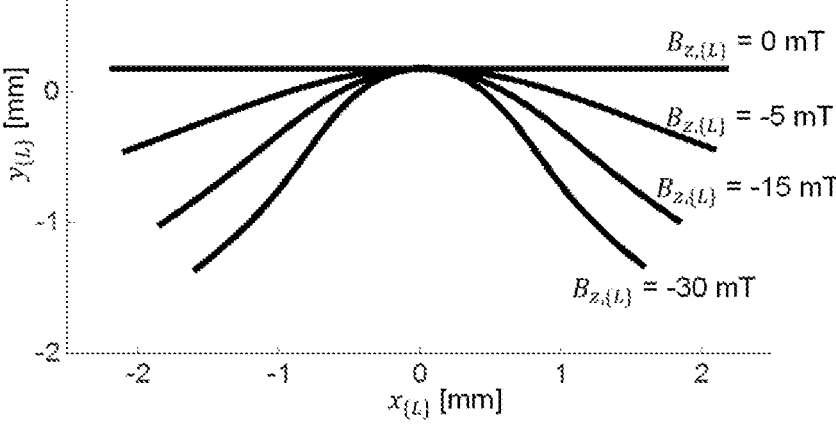
FIG. 12C 100 / 400
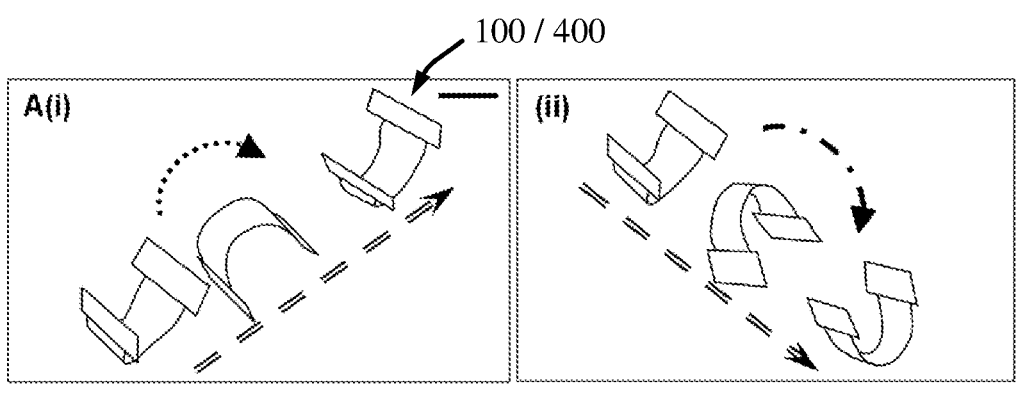
FIG. 14A(i)                              FIG. 14A(ii)
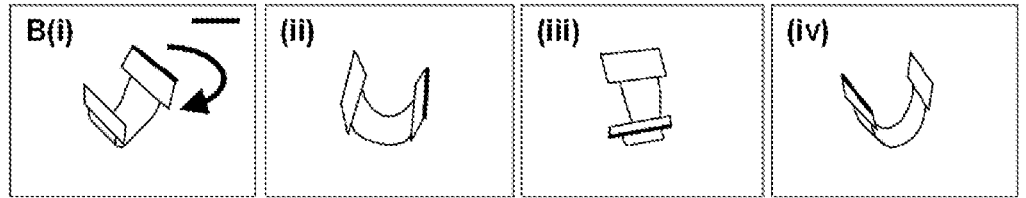
FIG. 14B(i)          FIG. 14B(ii)          FIG. 14B(iii)          FIG. 14B(iv)
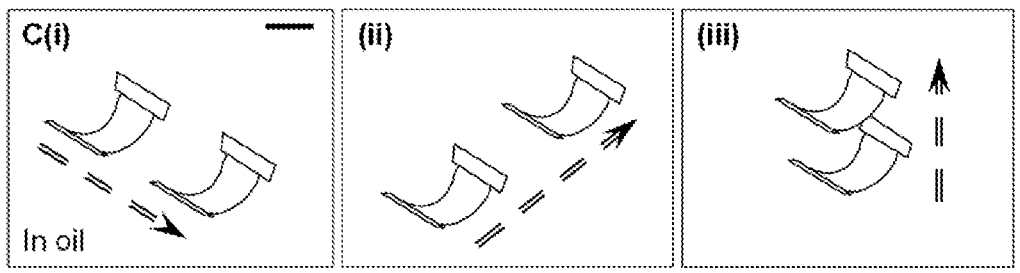
FIG. 14C(i)                    FIG. 14C(ii)                    FIG. 14C(iii)

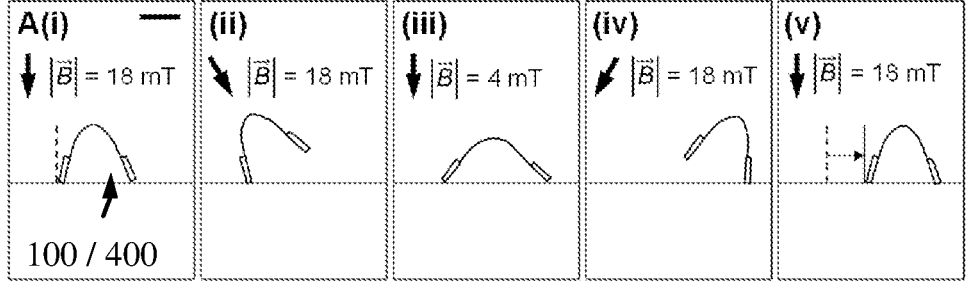
FIG. 15A
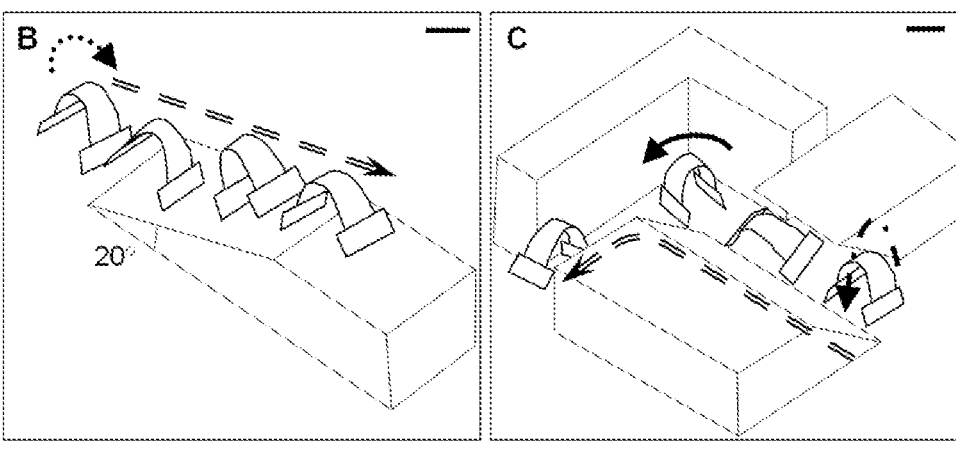
FIG. 15B                    FIG. 15C

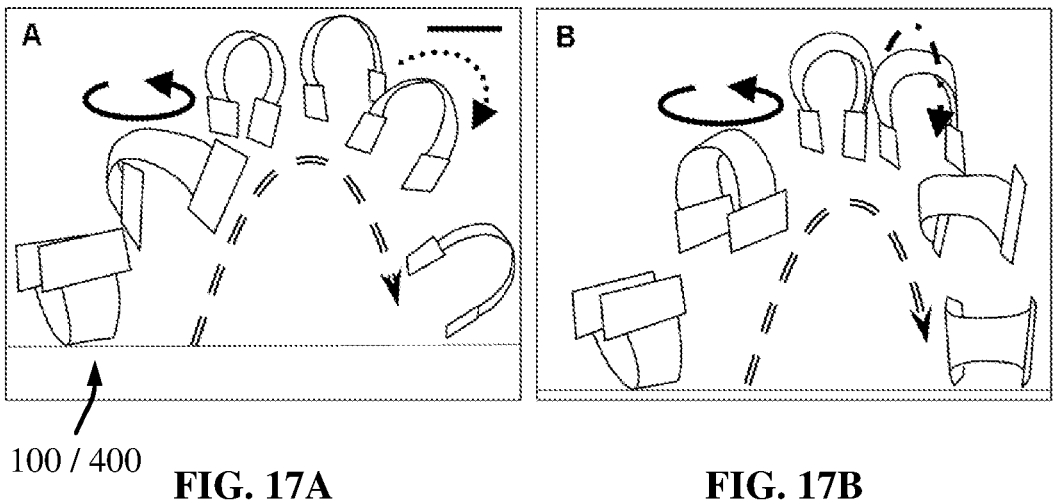
100 / 400    FIG. 17A                    FIG. 17B
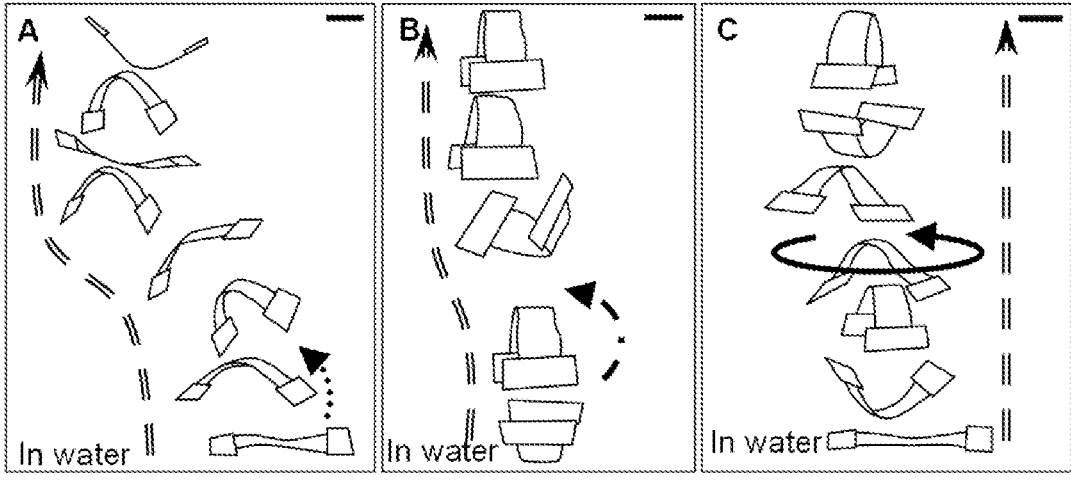
FIG. 18A          FIG. 18B          FIG. 18C

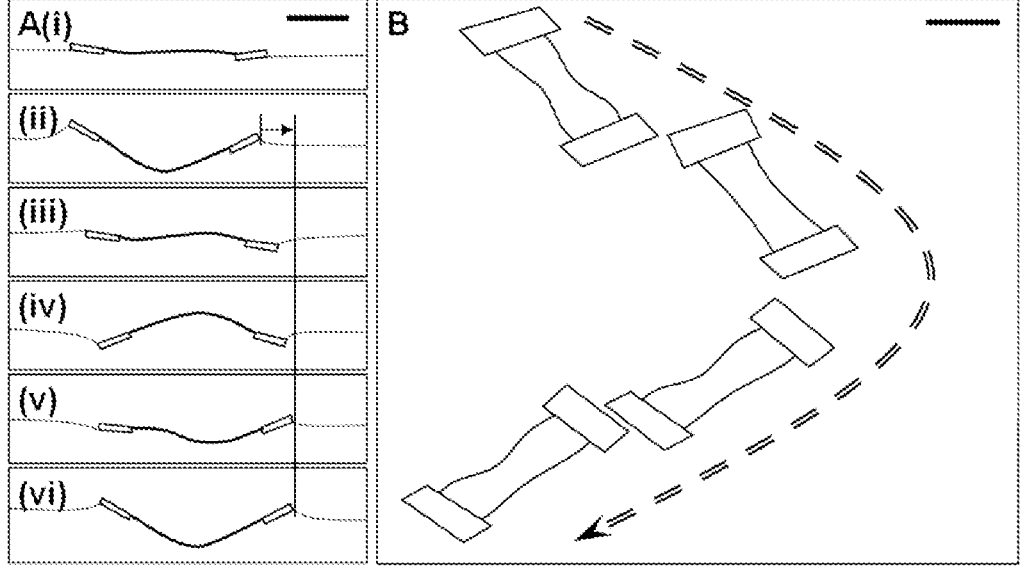
FIG. 19A                    FIG. 19B
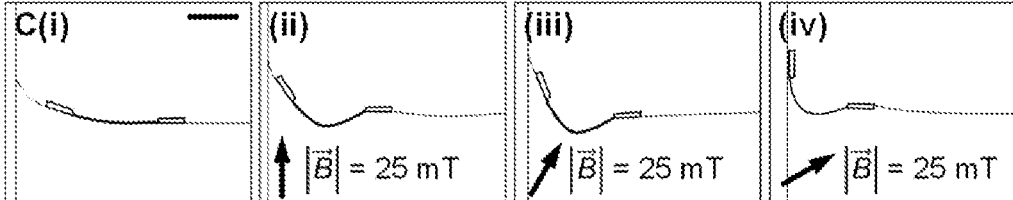
FIG. 19C(i)     FIG. 19C(ii)     FIG. 19C(iii)     FIG. 19C(iv)

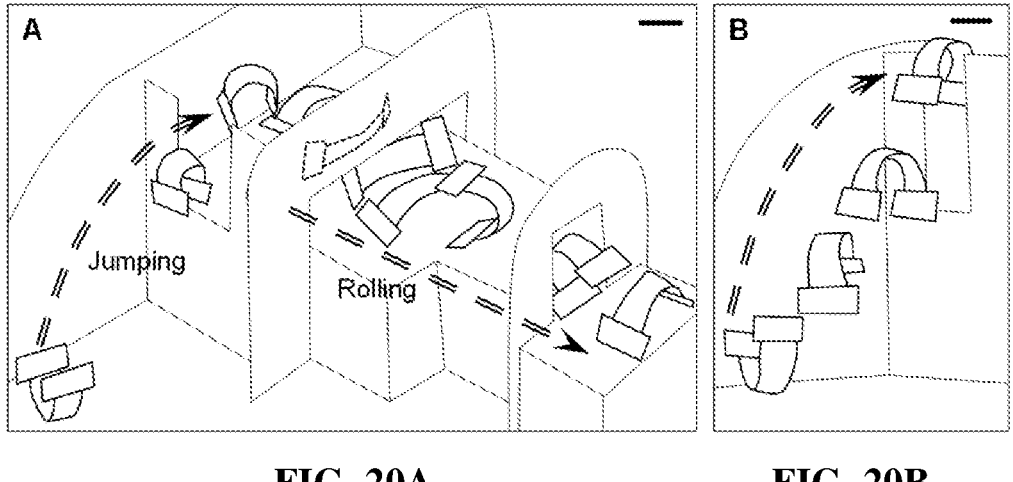
FIG. 20A                    FIG. 20B
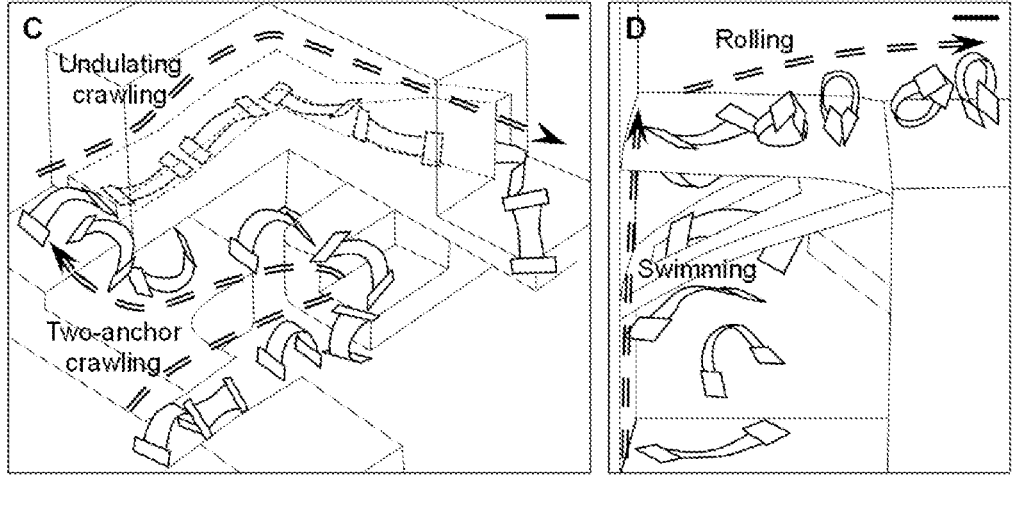
FIG. 20C                    FIG. 20D

MAGNETIC MINIATURE ROBOTS

CROSS-REFERENCE TO RELATED APPLICATION

The present application claims benefit of priority to the Singapore patent application no. 10202204044R filed Apr. 19, 2022, and the Singapore patent application no. 10202205530Q filed May 24, 2022, the contents of which are hereby incorporated by reference in entirety for all purposes.

TECHNICAL FIELD

The present application relates to magnetically operable actuators, and more specifically to magnetic robots in the millimeter scale or smaller.

BACKGROUND

Many useful applications, such as minimally invasive surgery and targeted drug delivery, require the miniature robot to have precise and dexterous six degrees-of-freedom (DOF) motion in order to carry out micro/nano-manipulation tasks in highly confined and enclosed spaces. The conventional magnetically operated robot is limited to orientation control in five DOF. It remains particularly challenging to achieve orientation control for the sixth-DOF without compromising the performance of the robot in the other DOF.

SUMMARY

A method of making a magnetic miniature robot (MMR), the method comprising: rotationally deforming a segment of material about a rotational deformation axis, from an initial shape to a deformed shape, the material including a plurality of magnetic particles distributed in an elastic matrix; magnetizing the plurality of magnetic particles in the segment to form a magnetized segment which in the deformed shape is characterized by a uniform magnetization profile; after the magnetization process, enabling the magnetized segment to elastically recover the initial shape and form a non-uniform magnetization profile; and coupling together at least one pair of the segment to form a main component, wherein the non-uniform magnetization profiles of the at least one pair of the segment are disposed in opposing orientations to configure the main component with a zero net magnetic moment about a sixth degree-of-freedom (DOF) axis.

A method of actuating a magnetic miniature robot (MMR) to a target location in a target orientation, the method comprising: configuring an actuating magnetic field such that a minimum potential energy configuration of the MMR corresponds to the target orientation; applying the actuating magnetic field to the MMR as a time-varying magnetic field to generate a time series of a restoring torque in at least one of three rotational DOF, wherein the restoring torque is configured to act on the MMR to repeatedly return the MMR to the minimum potential energy configuration.

A magnetic miniature robot, comprising: a deformable component having a longitudinal body with two ends, the longitudinal body being bendable about a transverse plane defined at the center of the longitudinal body, the deformable component being configured with a non-uniform magnetization profile defining a net magnetic moment axis that is perpendicular to the transverse plane, wherein magnetic field vectors at the two ends are in the same direction as one another, and parallel to the net magnetic moment axis.

BRIEF DESCRIPTION OF THE DRAWINGS

In the drawings, like reference characters generally refer to the same parts throughout the different views.

FIGS. 1A(i)-1A(ii) are schematic drawings of an exemplary magnetic miniature robot (MMR) capable of controllable movement in six degrees-of-freedom (DOF);

FIGS. 1B(i)-1B(vii) are schematic drawings illustrating one embodiment of a method of making a six-DOF MMR;

FIGS. 2A-2E are schematic drawings illustrating another embodiment of the method of making the six-DOF MMR;

FIG. 3A are schematic drawings illustrating a method of actuating the MMR according to one embodiment of the present disclosure;

FIG. 3B show the frames of reference used in the present disclosure;

FIGS. 4A-4B are line drawing representations of images captured of the MMR in experiments demonstrating the proposed actuation method;

FIGS. 5A-5C illustrate an experiment in which another prototype of the MMR demonstrated six DOF control to navigate through differently shaped openings in rigid walls;

FIGS. 6A-6D are schematic drawings of another exemplary six-DOF MMR with deformable tentacles coupled to a rigid main component;

FIGS. 7A-7B are schematic diagrams of another exemplary six-DOF MMR configured as a gripper;

FIGS. 10A-10B are schematic drawings of another embodiment of the MMR with a deformable main component;

FIGS. 11A-11C are schematic drawings illustrating a method of magnetizing the MMR of FIGS. 10A-10B;

FIGS. 12A(i)-12C are schematic diagrams showing a deformation mechanism of the MMR;

FIGS. 14A(i)-14C(iii) are line drawing representations of images captured of the MMR demonstrating rotation and translation in six DOF;

FIGS. 15A-15C are line drawing representations of images captured of the MMR demonstrating a two-anchor crawling locomotion;

FIGS. 17A-17B are line drawing representations of images captured of the MMR demonstrating a jumping locomotion;

FIGS. 18A-18C are line drawing representations of images captured of the MMR demonstrating a jellyfish-like swimming locomotion;

FIGS. 19A-19B are line drawing representations of images captured of the MMR demonstrating an undulating swimming locomotion;

FIGS. 19C(i)-19C(iv) are line drawing representations of images captured of the MMR demonstrating a meniscus-climbing locomotion;

FIGS. 20A-20D are line drawing representations of images captured of the MMR demonstrating multimodal amphibious locomotion.

DESCRIPTION

Figure 8:
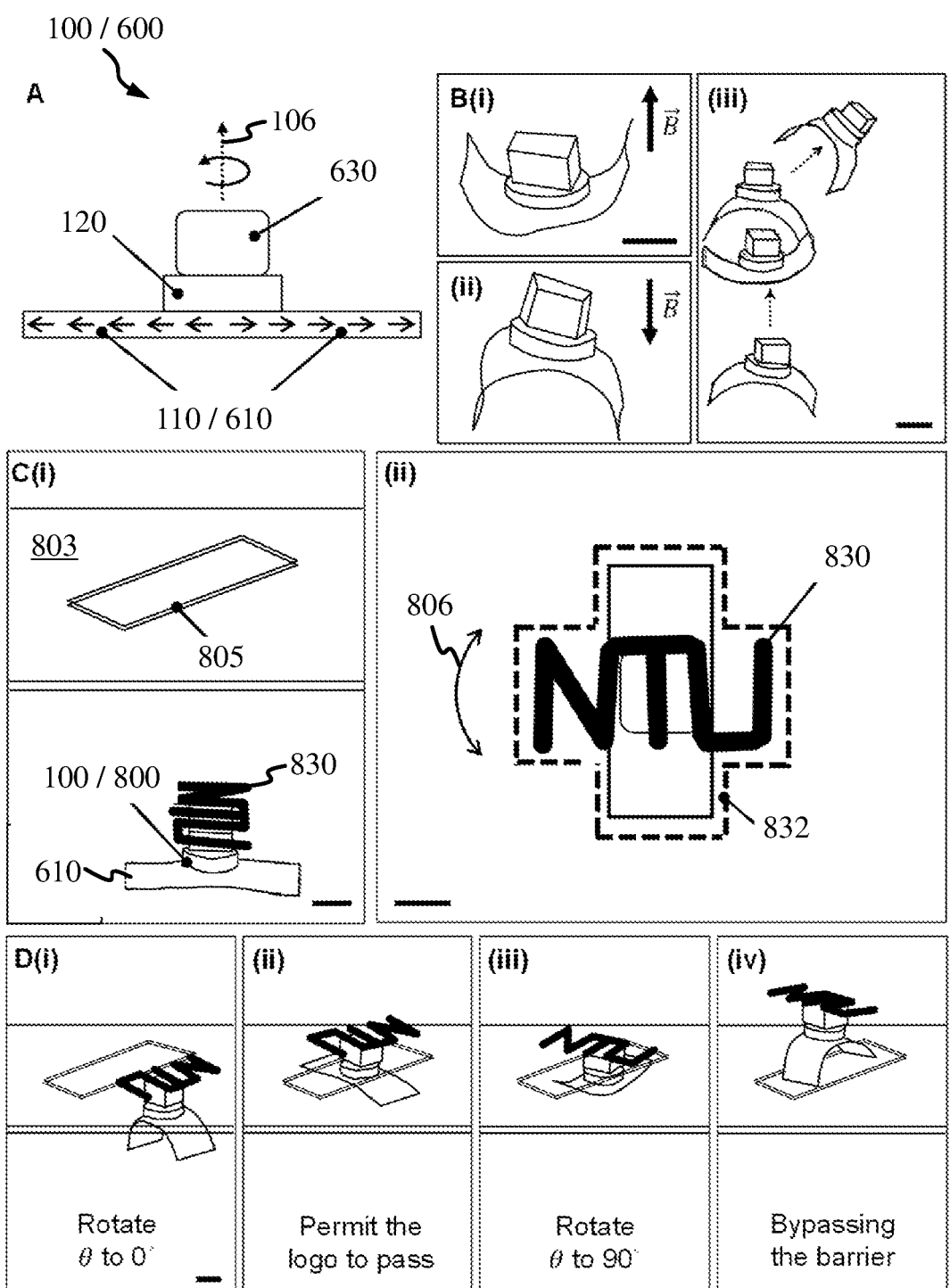
FIG. 8A are line drawing representations of images captured in a series of experiments involving the MMR of FIGS. 6A-6D.

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance, e.g. within 10% of the specified value.

As used herein, the term "and/or" includes any and all combinations of one or more of the associated listed items.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

MMR

The present disclosure describes a magnetic miniature robot (MMR) 100 including an auxiliary magnet 110 coupled with a main component 120. In the example illustrated in FIG. 1A(i), the auxiliary magnet 110 and the main component 120 are aligned along an axis 106 that is coincidental with an axis of rotational symmetry of the main component 120. In the present disclosure, for convenience, this axis will be referred to as a sixth degree-of-freedom (sixth-DOF) axis 106 of the MMR 100.

The main component 120 possesses a non-uniform magnetization profile ($\vec{M}_m$), which is characterised by a zero net magnetic moment [FIG. 1A(ii)]. This magnetization profile can be approximated as a distribution of magnetic dipoles in the main component. The auxiliary magnet 110 is characterised by a uniformly magnetic profile that will offer a net magnetic moment ($\vec{m}$) to the MMR. When the magnetization profiles of the main component and the auxiliary magnet are considered as a whole, they form a resultant magnetization profile of the MMR 100 ($\vec{M}$), and the sixth-DOF rotational axis would be coincidental with the axis about the MMR's $\vec{m}$ (FIG. 1A(i)).

Method of Fabricating a Six-DOF MMR

FIGS. 1B(i)-1B(vii) schematically illustrates a fabrication method 200. The fabrication method 200 includes making the main component 120. The fabrication method 200 includes providing a plurality of identical segments 130 of an elastic material in an initial shape and initial volume. For example, the segments may be a soft polymer (for example, but not limited to, Ecoflex 00-10 available from Smooth-on, Inc) with magnetic particles or magnetizable particles (for example, but not limited to, NdFeB particles) distributed substantially uniformly in the polymer. The substantially uniform distribution of magnetic particles in the elastic matrix may be fixed by curing the polymer. The mass ratio between the polymer and magnetic particles may be about 1:1. Each segment 130 formed in the initial shape by molding or 3D printing. In this example, the initial shape defines a quadrant cross-section as schematically illustrated in FIG. 1B(i).

Using a jig, a first end (or first surface) 131 of the segment 130 is fixed and concurrently a second end (or second surface) 132 of the segment 130 is rotated or rotatably stretched, as shown in FIGS. 1B(i)-1B(ii), i.e., the segment undergoes a rotational deformation. The shape of the segment is bounded by the first surface and the second surface. In this example, each segment is stretched so that its cross section is stretched or elastically deformed from the initial shape of a quadrant to a deformed shape/stretched shape of a semi-circle. That is, the deformed shape may be described as defining a semicircular cross-section. In the example, the second surface 132 is angularly displaced relative to the first surface 131 until the first surface 131 and the second surface 132 are substantially anti-parallel or substantially parallel.

For the purpose of the present disclosure, in a rotational deformation, all points along a radial line of the segment will undergo the same amount of deformation. The radial line may be taken to extend from a rotational deformation axis. For example, all the points along the second surface 132 of the segment would have undergone the same angular displacement (in an anti-clockwise direction as viewed in FIG. 1B(i)) as a result of this rotational deformation, while all the points along the first surface 132 remain stationary and/or undeformed. The entire segment is stretched substantially uniformly, and the corresponding rotational deformation ($\varphi$) along any radial line can be determined via interpolating the rotational deformations of the second surface relative to the first surface.

A strong, uniform magnetic field is applied to the stretched segment to permanently magnetize the magnetic particles therein. In the example, the segment in the stretched state is magnetized by a strong, uniform magnetic field of about 1.1 T [FIG. 1B(iii)]. In the example illustrated, the strong, uniform magnetic field is directed along the local reference frame's x-axis.

The step of magnetization is followed by a step of recovery in which the segment is allowed to elastically recover the initial shape. All the radial lines would have to undergo a reverse angular displacement or rotation of −φ. In this example, the segment recovers its initial shape of a quadrant. The magnetization profile 140 formed in the stretched state is re-configured by the recovery of the initial state of the segment into a non-uniform magnetization profile. FIG. 1B(iv) schematically illustrates a post-recovery magnetization profile 142 as an example.

A plurality of the segments 130 having the post-recovery magnetization profile may be coupled together by adhesive bonding 136 to form an assembly 138. In this example, four segments, each having a post-recovery shape of a quadrant and orientated differently, can be adhesively bonded together to form a main component 120 [FIG. 1B(v)]. Alternatively, at least a pair of the magnetized segments 130 may be coupled together in opposing directions to form an assembly characterized by a zero net magnetic moment about the sixth-DOF axis. The resulting assembly 138 has a target magnetization profile for controllable six DOF movement. The auxiliary magnet 110 may be coupled (e.g., adhesively bonded) to the main component 120 to form the MMR 100 according to one embodiment of the present disclosure, as illustrated in FIG. 1B(vii).

The assembly 138 can be used as the main component 120. Advantageously, this method advantageously allows the assembly 138 to be formed by segments sized larger than the desired main component 120, followed by cutting an at-scale piece from the center of the assembly 128 to serve as the main component 120. In the example of FIG. 1B(vi), a cylindrical piece is cut out from the center of the assembly as a non-limiting example. As $\vec{M}_m$ is identical along the radial lines of the assembly 138, no matter what shape the cut-out piece possesses, it can always fully inherit the magnetization profile of the assembly 138. This advantageously facilitates practical manufacturing of the proposed MMR in the millimeter scale or smaller. In general, main components of any shape can be cut out, e.g., using laser machining or other mechanical techniques. If the desired main component 120 is thicker than the thickness of the assembly, multiple cut out pieces may be stacked, aligned, and bonded together.

The shapes of the undeformed and rotationally deformed segments 130 may be varied. For example, as illustrated in FIGS. 2A-2E, the fabrication method 200 of the present disclosure may be practiced with the segment molded with a semi-circular shape. Rotational deformation about a rotational deformation axis stretches the initial shape of the segment 130 into a circular shape (FIGS. 2A-FIGS. 2B). That is, the deformed shape may be described as defining a circular cross-section. Rotational deformation is effected in a substantially uniform manner in the body of the segment 130, with the points along a radial line (extending from the rotational deformation axis) undergoing the same angular displacement. Preferably, the first surface 131 and the second surface 132 in the deformed state are parallel or anti-parallel, regardless of the initial angle (in the undeformed state) between the first surface 131 and the second surface 132. Magnetization is carried out by subjecting the deformed segment to a strong, uniform magnetic field 140 in a direction substantially parallel/anti-parallel to the deformed second surface and/or the first surface (FIG. 2C). For the sake of brevity, it is assumed that the first surface 131 is stationary throughout the deformation process and the recovery process. Upon recovery of the initial undeformed shape, the magnetization profile 142 in the segment is re-configured as illustrated in FIG. 2D. At least a pair of the segments 130 are coupled together in opposing orientations to form an assembly. That is, two or more identical ones of the segments 130 are oriented in opposite directions and bonded together FIG. 2E to form an assembly with the target magnetization profile 122. The assembly 138 may be used as the main component 120 of the present MMR 100. Alternatively, a smaller piece may be cut out from the center of the assembly 138 for use as the main component 120.

The shape of the auxiliary magnet 110 can be configured accordingly to suit different applications. The auxiliary magnet 110 also does not need to be rigid and it can be replaced by active soft components as long as these components can provide a net magnetic moment for the six-DOF MMR 100. As a non-limiting example, the auxiliary magnet 110 is illustrated in FIG. 1A and FIG. 1B(vii) with the shape of a triangular prism. Such a component can be constructed via molding a polymer matrix (for example but not limited to, Polydimethylsiloxane or PDMS available from Dow Corning), which has magnetic particles (for example but not limited to NdFeB magnetic particles) embedded therein. The embedded magnetic particles may be mixed uniformly within the polymer matrix and the composite cured (e.g., by baking). Once molded, the auxiliary magnet 110 may be magnetized uniformly by a strong magnetic field. Thereafter, the auxiliary magnet 110 may be adhesively bonded to the main component 120 to form the proposed MMR 100.

Actuation Method

The actuation method proposed herein is applicable to various types of MMRs, e.g., MMRs with a rigid main component or a soft (flexible) main component, or MMRs characterized by hard magnetic properties or soft magnetic properties. To better aid understanding of its advantages, the present actuation method will be described with reference to an MMR capable of controllable movement in six DOF (also referred to as a "six-DOF MMR"). In one aspect, the proposed actuation method is preferably applied to a six-DOF MMR which has a six-DOF rotation that can be controlled independently of the other conventionally-achievable five-DOF rigid-body motions (translation along three orthogonal axes and rotation about the two axes orthogonal to the six-DOF axis).

According to the present actuation method, the magnetic actuating signals may be assumed to be substantially uniform across the MMR's main component. Advantageously, it is not required to provide magnetic actuating signals that are spatially-invariant at small-scales (millimeter-scale or smaller). Additionally, the time-varying magnetic field $\vec{B}$ may be assumed to have only five independent spatial-gradients owing to the constraints of the Gauss's law and the Ampere's law:

$$\vec{B} = \begin{bmatrix} B_x & B_y & B_z \end{bmatrix}^T, \tag{1}$$

$$\vec{B}_{grad} = \begin{bmatrix} \dfrac{\partial B_z}{\partial x} & \dfrac{\partial B_z}{\partial y} & \dfrac{\partial B_z}{\partial z} & \dfrac{\partial B_y}{\partial y} & \dfrac{\partial B_x}{\partial y} \end{bmatrix}^T$$

where $\vec{B}_{grad}$ refers to the time-varying vector of the magnetic field, and where $B_x$, $B_y$ and $B_z$ represent the Cartesian x-, y- and z-components of $\vec{B}$, respectively.

The present actuation method includes controlling the actuating magnetic signals (i.e., configuring the applied magnetic field or actuating magnetic field within which the MMR is operable) under quasi-static conditions such that the six-DOF MMR will constantly experience three axes of restoring torques. Under the influence of the restoring torques, the MMR's three axes of angular displacements will self-align into their respective target angles, as illustrated schematically in FIGS. 3A(i)-3A(ii). The present actuation method may include applying the actuating magnetic field in which the target orientation corresponds to a minimum potential energy configuration of the MMR. When the MMR is in a rotational equilibrium state with its angular displacements corresponding to the target angles, the presence of restoring torques enables the MMR to reject external torque disturbances that tend to misalign MMR and maintain the target orientation. In other words, by making the target orientation into a minimum potential energy configuration of the MMR, the MMR in any arbitrary orientation will constantly experience three axes of restoring torques until it achieves the target orientation. To aid description, reference may be made in the present disclosure to the reference frames, namely, a global reference frame (frame of reference) as illustrated in FIG. 3B(i), an intermediate reference frame as illustrated in FIG. 3B(ii), and a local reference frames of the MMR as illustrated in FIG. 3B(iii), respectively. For convenience, before the MMR is rotated, its local reference frame as shown in FIG. 3B(iii) may be defined to coincide with the global reference frame of FIG. 3B(i).

According to one aspect of the present disclosure, the MMR is configured with a magnetization profile $\vec{M}$ that results in an external wrench or a non-zero net magnetic torque when under the influence of a varying actuating magnetic field ($\vec{B}$ and $\vec{B}_{grad}$).

$$\begin{pmatrix} \vec{\tau}_{\{L\}} \\ \vec{F}_{\{L\}} \end{pmatrix} = D \begin{pmatrix} \vec{B}_{\{L\}} \\ \vec{B}_{grad,\{L\}} \end{pmatrix}, \tag{2}$$

where $\vec{\tau}$ is the net magnetic torque experienced by the MMR, $\vec{F}$ is the magnetic force experienced by the MMR, and where the matrix D is a full ranked matrix. In this example, $$D = \begin{pmatrix} 0 & -m & 0 & d_1 & d_2 & d_3 & d_4 & d_5 \\ m & 0 & 0 & d_6 & d_7 & d_8 & d_9 & d_{10} \\ 0 & 0 & 0 & d_{11} & d_{12} & d_{13} & d_{14} & d_{15} \\ 0 & 0 & 0 & m & 0 & 0 & 0 & 0 \\ 0 & 0 & 0 & 0 & m & 0 & 0 & 0 \\ 0 & 0 & 0 & 0 & 0 & m & 0 & 0 \end{pmatrix} \tag{3}$$

where the elements $d_1$-$d_{15}$ in Equation (3) are functions of the geometry of the MMR and $\vec{M}$. Define the Cartesian components of $r$ and $\vec{M}$ to be $\vec{r} = (r_x\ r_y\ r_z)^T$ and $\vec{M} = (M_x\ M_y\ M_z)^T$, respectively, the elements in Equation (3) may be expressed as follows:

$$d_1 = \iiint r_y M_x dV, d_2 = \iiint (r_y M_y - r_z M_z) dV, d_3 = \iiint r_y M_z dV,$$

$$d_4 = \iiint -r_z M_y dV, d_5 = \iiint -r_z M_x dV, d_6 = \iiint (r_z M_z - r_x M_x) dV,$$

$$d_7 = \iiint -r_x M_y dV, d_8 = \iiint (-r_z M_x - r_x M_z) dV,$$

$$d_9 = \iiint -r_z M_x dV, d_{10} = \iiint r_z M_y dV,$$

$$d_{11} = \iiint -r_y M_z dV, d_{12} = \iiint r_x M_z dV, d_{13} = \iiint r_y M_x dV,$$

$$d_{14} = \iiint (r_x M_y + r_y M_x) dV, d_{15} = \iiint (r_x M_x - r_y M_y) dV. \tag{4}$$

Equation (2) may be mapped to an intermediate reference frame [FIG. 3B(ii)]:

$$\begin{pmatrix} \vec{\tau}_{\{I\}} \\ \vec{F}_{\{I\}} \end{pmatrix} = [C(\theta)] \begin{pmatrix} \vec{B}_{\{I\}} \\ \vec{B}_{grad,\{I\}} \end{pmatrix}, \tag{5}$$

where $C(\theta) = \begin{pmatrix} R_z(\theta) & 0_{3\times3} \\ 0_{3\times3} & R_z(\theta) \end{pmatrix}[D][A(\theta)]$, $$R_z(\theta) = \begin{pmatrix} \cos\theta & -\sin\theta & 0 \\ \sin\theta & \cos\theta & 0 \\ 0 & 0 & 1 \end{pmatrix}.$$

$0_{3\times3}$ is a 3×3 zero matrix. C is the control matrix and is a full-ranked 6×8 matrix when the rank of D is full, i.e., $$C(\theta) = \tag{6}$$

$$\begin{pmatrix} 0 & -m & 0 & d_1\cos^2\theta + d_{15}\sin\theta\cos\theta + d_7\sin^2\theta & d_2\cos^2\theta + d_{14}\sin\theta\cos\theta - d_6\sin^2\theta & d_3\cos\theta + (d_5 - d_8)\sin\theta & d_4\cos\theta + d_5\sin\theta & d_5\cos\theta - d_4\sin\theta \\ m & 0 & 0 & d_6\cos^2\theta + d_{14}\sin\theta\cos\theta - d_2\sin^2\theta & d_7\cos^2\theta - d_{15}\sin\theta\cos\theta + d_1\sin^2\theta & d_8\cos\theta + (d_3 - d_4)\sin\theta & d_5\cos\theta - d_4\sin\theta & -(d_4\cos\theta + d_5\sin\theta) \\ 0 & 0 & 0 & d_{11}\cos\theta - d_{12}\sin\theta & d_{11}\sin\theta + d_{12}\cos\theta & d_{13} - d_{14}\sin^2\theta + d_{15}\sin\theta\cos\theta & d_{14}\cos2\theta + d_{15}\sin2\theta & -d_{14}\sin2\theta + d_{15}\cos2\theta \\ 0 & 0 & 0 & m & 0 & 0 & 0 & 0 \\ 0 & 0 & 0 & 0 & m & 0 & 0 & 0 \\ 0 & 0 & 0 & 0 & 0 & m & 0 & 0 \end{pmatrix}.$$

To make the target orientation of the MMR into a minimum potential energy configuration, $\vec{\tau}_{\{I\}}$ in Equation (5) is specified as a null vector at the target $\theta$. When the MMR experiences zero torque at the target orientation, a magnetic force $\vec{F}_{\{I\}}$ can be specified for the MMR. This advantageously enables translation of the MMR with the desired magnetic forces while the MMR is under precise orientation control. Based on the desired $\vec{F}_{\{I\}}$, the required actuating magnetic signals of the present actuation method can be obtained by solving Equation (5). Equation (7) presents the general solution of the actuating magnetic fields:

$$\begin{pmatrix} \vec{B}_{\{I\}} \\ \vec{B}_{grad,\{I\}} \end{pmatrix} = C^T[CC^T]^{-1}\begin{pmatrix} \vec{0}_{3\times1,\{I\}} \\ \vec{F}_{\{I\}} \end{pmatrix} + k_1\begin{pmatrix} 0 \\ 0 \\ 1 \\ 0 \\ 0 \\ 0 \\ 0 \\ 0 \end{pmatrix}_{\{I\}} + \tag{7}$$

-continued $$
k_2 \begin{pmatrix} \dfrac{(d_5 d_{14} - d_4 d_{15})\sin\theta - (d_4 d_{14} + d_5 d_{15})\cos\theta}{(d_{15}\cos 2\theta - d_{14}\sin 2\theta)m} \\ \dfrac{(d_4 d_{15} - d_5 d_{14})\cos\theta - (d_4 d_{14} + d_5 d_{15})\sin\theta}{(d_{15}\cos 2\theta - d_{14}\sin 2\theta)m} \\ 0 \\ 0 \\ 0 \\ 0 \\ 1 \\ -\dfrac{d_{14}\cos 2\theta + d_{15}\sin 2\theta}{d_{15}\cos 2\theta - d_{14}\sin 2\theta} \end{pmatrix}_{\{I\}}
$$

The first right-hand component represents the particular solution obtained via pseudo-inverse, while the other two vectors on the right are the null space vectors of C representing the homogeneous solutions. The scalar variables $k_1$ and $k_2$ are the scale factors of the null space vectors. The variables $d_4$, $d_5$, $d_{14}$ and $d_{15}$ are the elements of D, and m represents the magnitude of $\vec{m}$.

Unlike the conventional actuation methods, the closed-form solution presented above can describe the actuation principles of MMR under quasi-static conditions and enable effective six DOF control of the MMR.

The pseudo-inverse solution in Equation (7) ensures that the MMR will be in a rotational equilibrium state when it reaches the target orientation (i.e., the minimum potential energy configuration), and also that the desired $\vec{F}_{\{I\}}$ can be applied to the MMR. The restoring torques can be controlled by tuning the actuating signals via the homogeneous solutions.

The first null space vector in Equation (7), $(0\ 0\ 1\ 0\ 0\ 0\ 0)_{\{I\}}^T$, adjusts $\vec{B}$ such that it can become stronger along its z-axis component, i.e., this vector is used for increasing $B_{z,\{I\}}$. Increasing the magnitude of $B_{z,\{I\}}$ increases the restoring torque and aligns the MMR's $\vec{m}$ to the target direction. A stronger restoring torque may be preferred because it empowers the MMR to reject torque disturbances more effectively. This null space vector can only generate two axes of restoring torques for the MMR and it has no effect on the sixth-DOF rotation of the MMR.

The second null space vector is proposed herein for actuating MMRs. By adjusting the magnetic actuating signals in Equation (7) via this null space vector, the MMR's sixth-DOF angular displacement may be controlled to self-align into the target angle θ and to maintain the target angle. The singularity points will occur when the denominator of the components in the second null space vector approaches zero, i.e., $d_{15}\cos(2\theta) - d_{14}\sin(2\theta)=0$ or when $d_{14}\cos 2\theta + d_{15}\sin 2\theta=0$. The bases of the null space vector may be varied according to the range of θ so that the singularity points can always be avoided when the MMR follows an angular trajectory.

The general solution in Equation (7) can be applied to six-DOF MMRs with rigid bodies or soft deformable bodies.

According to one aspect of the present disclosure, the magnetization and stiffness profiles of the main component is configured to be rotationally symmetrical about the sixth-DOF axis, and to only allow the MMR to execute their time-varying deformations (deformation over time) by adjusting the magnitude of the first null space vector in Equation (7). This actuation method was experimentally confirmed to be viable, as will be understood from the experiments described below.

Preferably, the highest permissible magnitudes of $k_1$ and $k_2$ are used to maximize the restoring torques. The magnitudes of $k_1$ and $k_2$ are in practice constrained by the capacity of the magnetic actuation systems, and the strength of the restoring torques are dependent on the MMR's configuration (i.e., its D matrix).

The MMR is preferably configured with a physical and magnetization profile which can maximize the sixth-DOF restoring torque, an example of which is illustrated by FIG. 1A. Because the actuating signals have to be eventually specified according to a global reference frame, the computed $\vec{B}_{\{I\}}$ and $\vec{B}_{grad,\{I\}}$ in will be mapped into this reference frame [FIG. 3B(i)]:

$$
\begin{pmatrix} \vec{B}_{\{G\}} \\ \vec{B}_{grad,\{G\}} \end{pmatrix} = \begin{bmatrix} R_x(\alpha)R_y(\beta) & 0_{3\times5} \\ 0_{5\times3} & A_2(\alpha,\beta) \end{bmatrix} \begin{pmatrix} \vec{B}_{\{I\}} \\ \vec{B}_{grad,\{I\}} \end{pmatrix}, \tag{8}
$$

where $R_x$ and $R_y$ are the standard x- and y-axis rotational matrices, and $A_2$ can be expressed as:

$$A_2(\alpha,\beta) =\tag{9}$$

$$
\begin{bmatrix}
\cos(\alpha)\cos(2\beta) & \sin(\alpha)\sin(\beta) & \cos(\alpha)\sin(2\beta) & 0.5\cos(\alpha)\sin(2\beta) & \sin(\alpha)\cos(\beta) \\
0.5\sin(2\alpha)\sin(2\beta) & \cos(2\alpha)\cos(\beta) & -0.5\sin(2\alpha)\cos(2\beta) & 0.5\sin(2\alpha)\left(1+\sin^2(\beta)\right) & -\cos(2\alpha)\sin(\beta) \\
-\cos^2(\alpha)\sin(2\beta) & \sin(2\alpha)\cos(\beta) & \cos^2(\alpha)\cos(2\beta) & \sin^2(\alpha)-\cos^2(\alpha)\sin^2(\beta) & -\sin(2\alpha)\sin(\beta) \\
-\sin^2(\alpha)\sin(2\beta) & -\sin(2\alpha)\cos(\beta) & \sin^2(\alpha)\cos(2\beta) & \cos^2(\alpha)-\sin^2(\alpha)\sin^2(\beta) & \sin(2\alpha)\sin(\beta) \\
-\sin(\alpha)\cos(2\beta) & \cos(\alpha)\sin(\beta) & -\sin(\alpha)\sin(2\beta) & -0.5\sin(\alpha)\sin(2\beta) & \cos(\alpha)\cos(\beta)
\end{bmatrix}.
$$

The variables α and β represent the corresponding desired angular displacement about these axes, and together they define the intermediate reference frame as well as the desired orientation for $\vec{m}$ (FIG. 3B(i)-(ii)). The subscript {G} in Eq. (8) indicates that the vectors are expressed in the global reference frame. Equation (8) shows how the required actuating signals can be specified, according to the global reference frame, to make the MMR's target orientation into a minimum potential energy configuration.

According to one embodiment of the present actuation method, the trajectory of the MMR toward the target destination may be broken a sequence of discrete angular displacements, and each of the corresponding target orientations of the sequence of discreate angular displacements are defined as respective minimum potential energy configurations. Additionally, magnetic forces can be applied on the MMR at any point of the angular trajectory for translation and/or doing work.

Preferably, the angular trajectory of the MMR can be defined or broken down into more points (more discrete angular displacements) to reduce the deviation between two sequential orientations and thereby address the potential issue of there being multiple minimum potential energy configurations for any given set of actuating signals. In other words, the angular trajectory of the MMR is broken down into a sequence of multiple discrete angular displacements. Preferably, each of the discrete angular displacements small enough to make the MMR's next configuration essentially independent of the MMR's current orientation. This approach has been experimentally verified to enable relatively precise orientation control for the present six-DOF MMR.

Experimental Results

Experiments demonstrated the ability of the MMR to exhibit dexterous and precise manipulation capabilities. FIGS. 4A(i)-4A(vi) are line drawing representations of images captured during a series of experiments using a prototype of the present MMR. The MMR's local reference frame is shown in the inset of FIG. 4A(i). The MMR demonstrated the ability to execute rotation about the MMR's $z_{\{L\}}$-axis, $x_{\{L\}}$-axis, and $y_{\{L\}}$-axis, respectively, as shown in FIGS. 4A(i)-4A(iii). Specifically, the sixth-DOF rotation is shown in FIG. 4A(i). Translation along each of the MMR's $x_{\{L\}}$-axis, $y_{\{L\}}$-axis, and $z_{\{L\}}$-axis, respectively, is shown in FIGS. 4A(iv)-4A(vi).

FIGS. 4B(i)-4B(vi) are line drawing representations of a sequence of images captured over time. In the experiment, the actuation method proposed herein was implemented to make each of the angular displacements at 0°, 60°, 120°, 180°, 240°, and 300° the minimum potential energy configuration in turn. The tip of the auxiliary magnet was highlighted to better illustrate the MMR's sixth-DOF angular displacement. As shown by the experiment, the MMR could be made to rotate about the six-DOF axis in a precise and controllable manner, exhibiting angular displacements from 0° to 60° [FIGS. 4B(i)-4B(ii)], from 60° to 120° [FIGS. 4B(ii)-4B(iii)], from 120° to 180° [FIGS. 4B(iii)-4B(iv)], from 180° to 240° [FIGS. 4B(iv)-4B(v)], and from 240° to 300° [FIGS. 4B(v)-4B(vi)]. It was experimentally verified that the MMR could achieve a sixth-DOF angular velocity of about 173 degrees per second.

FIG. 5A shows an experimental set-up with a first wall and a second wall spaced apart from one another. FIGS. 5B(i)-5B(ii) show an opening in the first rigid wall and a differently shaped opening in the second rigid wall, as viewed from the same perspective. The MMR used in this experiment has a trapezoidal prism disposed on a disc-shaped base. It is evident that the MMR would not be able to pass through both openings unless the MMR is able to re-orientate itself. In fact, the openings and the shape of the MMR were intentionally designed so that the full six DOF actuation is needed with precise orientation in order for the MMR to pass through both openings. Before the experiment began, the global reference frame and the local reference frames were defined to coincide. FIG. 5C(i) showed a line representation of an image captured during the experiment, showing that the MMR could negotiate through the first wall after the MMR precisely rotated θ and β to −90° and 45°, respectively. FIG. 5C(ii) showed that the MMR successfully passed through the second wall after the MMR rotated θ and α to −90° and 30°, respectively.

Jellyfish-Like MMR with a Rigid Main Component

FIG. 6A illustrates a jellyfish-like MMR 600 having deformable tentacles 610 coupled to the main component 120. The magnetization profile of the deformable tentacles is configured to be substantial uniform from the geometric center to the respective ends of the deformable tentacles 610. The deformable tentacles 610 are configured to generate a net magnetic moment ($\vec{m}$) that is parallel to an external magnetic field $\vec{B}$ (also referred to as an applied magnetic field or actuating magnetic field), when $\vec{B}$ is applied along the sixth-DOF axis. The deformable tentacles 610 may be described as being corresponding to the auxiliary magnet 110 in FIG. 1A(i). When the direction of $\vec{B}$ is reversed (as shown in FIG. 6B), the direction of $\vec{m}$ will be reversed. In this MMR 100, a buoyant head 630 is disposed on the main component 120. The center of buoyancy 640 and the center of gravity 650 are aligned along the sixth-DOF axis 106 but are not coincident (as shown in FIGS. 6C-6D). Thus, when the MMR 100 is tilted relative to the gravitational force as shown in FIG. 6D, the buoyant force 660 will have an effective moment arm 670 to induce a rigid body torque, which tends to rotate the MMR back to the "upright" configuration of FIG. 6C. In other words, the MMR will automatically "correct" its pose and remain substantially upright. This may be useful in applications where it is desirable to keep the MMR in a substantially "upright" pose throughout its navigation path.

FIGS. 7A-7B illustrate another embodiment of the MMR which may be operable as a gripper 700. The MMR 100 includes an auxiliary magnet 110 that is sandwiched between and coupled to the proximal ends of two beams 720. The MMR includes two side magnets 730, each side magnet 730 being coupled to the respective distal ends of the two beams 720. The MMR includes a main component 120 stacked in alignment with the auxiliary magnet 110 so that the MMR 100 is capable of controllable sixth-DOF rotation. FIG. 7A shows the MMR in a default state. FIG. 7B shows the MMR in a deformed state in which the side magnets 730 are responsive to an actuating magnetic field $\vec{B}$ and rotate towards one another in a grabbing or gripping movement. By controlling the magnitude of $\vec{B}$ along the MMR's net magnetic moment, the MMR 100/700 can produce a grabbing motion of various grabbing or gripping strengths.

Experiments Using the Jellyfish-Like MMR

A series of experiments were conducted based on the jellyfish-like MMR 100/600 of FIG. 6 and FIG. 8A. FIGS. 8B-8D show line drawing representations of images captured during experiments when the MMR 100 is actuated to propel itself using a soft-bodied swimming locomotion. As shown in FIGS. 8B(i) and 8B(ii), the MMR 100 would assume either a "u"-shaped configured or an "n"-shaped configuration when the actuating magnetic field $\vec{B}$ was applied along the sixth-DOF axis 106 of the MMR. The propulsion direction of the MMR could be controlled by controlling the direction of $\vec{B}$, as shown in FIG. 8B(iii).

FIG. 8C(i) shows an experimental setup in the form of a rectangular opening 805 in a barrier 803. The MMR prototype used in this experiment includes deformable tentacles 610 and a logo 830 disposed at different ends of the MMR 100. The logo 830 and the deformable tentacles 610 are coupled to the buoyant head 630 and the main component 120 respectively with their respective longitudinal axes oriented substantially orthogonal to each other. As evident from the top view of FIG. 8C(ii), the MMR has an "x"-shaped profile or footprint.

FIGS. 8D(i)-8D(ii) show the MMR 100 rotated about its sixth-DOF axis 106 for the sixth-DOF angle θ to be 0° so that the logo 830 could be pass through the barrier opening 805. It is evident that in this orientation, the tentacles 110/610 will block further passage of the MMR 100 through the barrier opening 805. FIGS. 8D(iii)-8D(iv) show that the MMR 100 could be controllably rotated about its sixth-DOF axis 106 for the sixth-DOF angle θ to be 90° and thus permit the tentacles 110/610 of the MMR 100 to cross the barrier 830. The experiment demonstrated the MMR's dexterity and controllable movement in six-DOF.

Robotic Assembly

Figure 9:
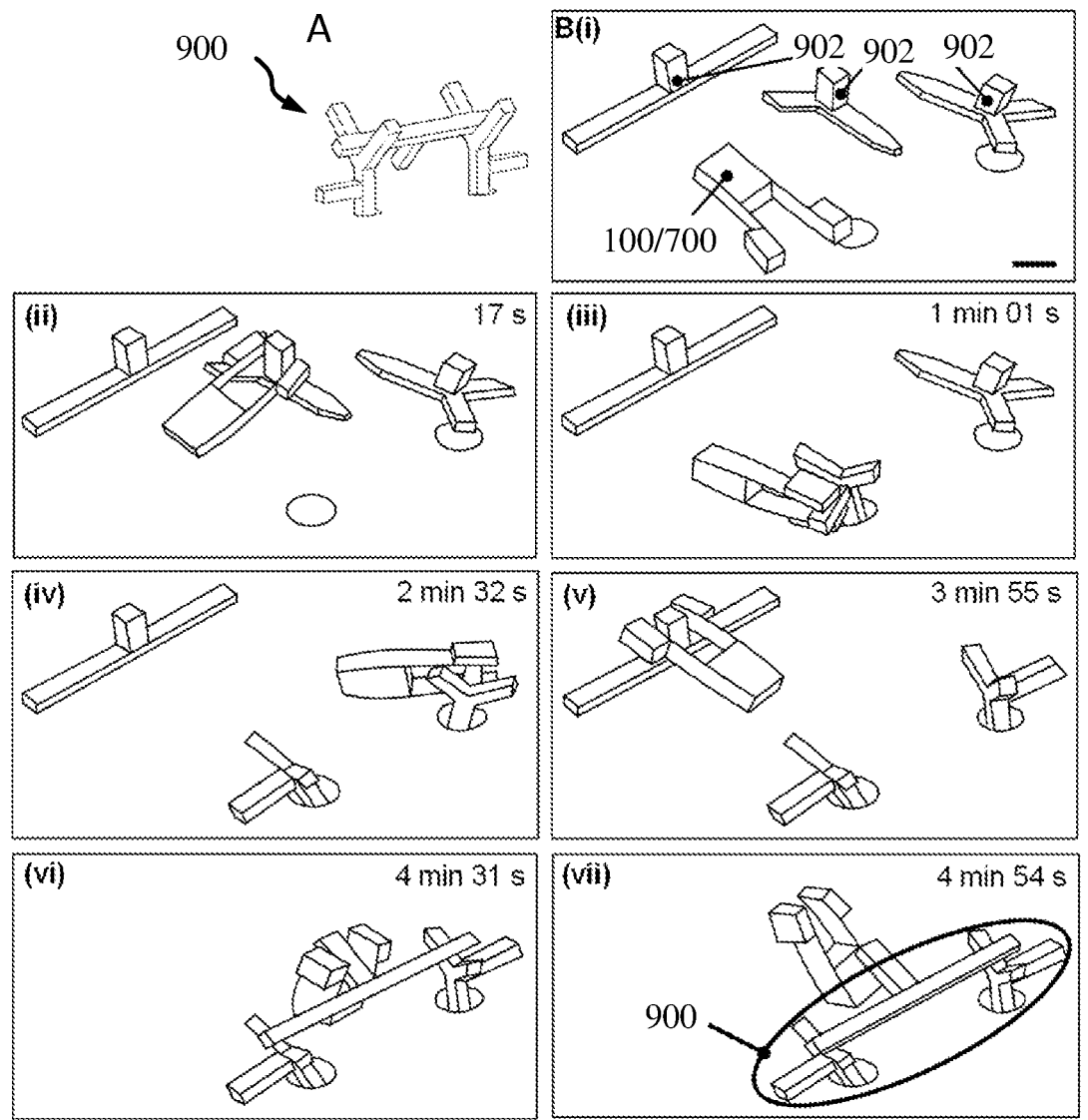
FIG. 9 includes line drawing representations of images captured of an experiment involving the MMR of FIGS. 7A-7B.

A series of experiments were conducted using the MMR of FIGS. 7A-7B to perform robotic assembly of a three-dimensional (3D) four-bar linkage assembly 900 (FIG. 9). The achievable torque in the sixth-DOF was also found to be comparable to the achievable torques about the other two orthogonal axes, i.e., large enough for practical applications, as evident by the ability of the MMR 100/700 in holding and/or manipulating the elements 902 of the four-bar linkage assembly. The experiments show that the six-DOF torque forces that produce the grabbing motion are strong enough for the MMR to grab an element 902, transport the object or element 902 to a target location, and hold the element 902 as the MMR re-orientate to a target orientation or travel to a target location.

FIGS. 9B(i)-9B(vii) are line drawing representations of time lapse images captured during the experiment. The experiment also demonstrated that a gripper based on the proposed MMR could complete a complicated, small-scale assembly task about 20 times faster than a conventional five-DOF robot.

Six-DOF Multimodal Soft-Bodied Locomotion

In the present disclosure, the term "soft-bodied MMR" refers to an MMR which includes at least one magnetic or magnetized component that is mechanically deformable to present a change in shape and/or physical dimensions. Soft-bodied locomotion generally presents additional challenges as the deformable component(s) can introduce further complications to the control of the MMR.

The following describes an example of a soft-bodied MMR 400 configured as a six-DOF MMR. The MMR 100 includes a deformable component 420 that is mechanically deformable, in which the deformable component 420 is configured with a magnetization profile 422 such that the directions of the null space vectors in Equation (7) will remain constant regardless of deformations occurring over a period of time (i.e., a series of time-varying deformations).

As shown in a top view in FIG. 10A and in a front view in FIG. 10B, one embodiment of the MMR 100 includes a longitudinal body or a beam with two ends 424. The longitudinal body is bendable about a transverse axis or a transverse plane 407. In the present disclosure, the beam may be described as a soft-bodied MMR or a deformable component 420. In a default or undeformed state, the deformable component 420 may be described as an integral elongate component magnetized with a magnetic field that is symmetrical about the net magnetic moment axis and characterized by a two-dimensional or three-dimensional magnetization profile 422. The magnetization profile refers to the pattern or distribution of the magnetic field vectors in the body of the deformable component, as schematically illustrated with arrows in FIG. 10B. Preferably, the magnetization profile is a two-dimensional (2D) or a three-dimensional (3D) magnetization profile characterized by an axis of symmetry coinciding with the net magnetic moment axis 406 extending through the geometric center of the deformable component. The magnetization profile is characterized by mirror symmetry about a transverse plane 407 intersecting the center of the deformable component 420.

The magnetic field vector at the geometric center of the deformable component 420 is substantially parallel to the net magnetic moment axis 406. The magnetic field vectors at the two ends 424 of the deformable component 420 are in the same direction as one another, and parallel to the net magnetic moment axis 406. The magnetization profile 422 may also be described herein as a harmonic magnetization profile. This refers to a continuous change of the direction of the magnetization field 422 from the center (coinciding with the net magnetic moment axis 406) of the deformable component to one end 424 of the deformable component. That is, the deformable component 420 is characterized by a non-uniform magnetization profile 422 in which all the magnetic particles are not oriented along the same direction.

The magnetization profile 422 of the deformable component 420 of FIG. 10B differs from the magnetization profile of the deformable component 610 of FIG. 6A. At both ends 424 of the deformable component 420 of FIG. 10B, the magnetization profile ($\vec{M}$) is characterized by a phase shift angle (φ) of −90° relative to a major plane 425 of the deformable component 420. In comparison, the deformable component 610 of FIG. 6A is characterized by a substantially uniform magnetization profile from the center to either end 624 of the deformable component 610, i.e., parallel to a major plane 625 of the deformable component 610.

Referring again to FIGS. 10A-10B, the deformable component 420 is characterized by a degree of elasticity or flexibility such that the deformable component 420 is bendable to bring its two ends closer to one another. The deformable component 420 may be made of an elastomeric material. Preferably, the deformable component 420 is flexible and sufficiently changeable in shape to enable dexterous locomotion while being sufficiently stiff to transmit forces to other objects or to the environment. Preferably, the deformable component 420 is sufficiently elastic to facilitate a jumping locomotion. Preferably, the MMR 100/400 has a substantially elongate flexible body actuated by the method of actuation described above. Preferably, the MMR 100 is configured with seven possible modes of locomotion. The modes of locomotion include one or more modes suitable for locomotion on land (terrestrial environment) and one or more modes suitable for locomotion in a liquid (aquatic environment), that is, the MMR 100 may be described as amphibious. The MMR 100 is suitable for controllable six-DOF locomotion in both terrestrial and aquatic environments. Preferably, the MMR 100 is configured for seven possible modes of locomotion with six-DOF in terrestrial environments and/or aquatic environments. The seven possible modes of locomotion include: rolling, two-anchoring, undulating crawling, jumping, swimming with two different gaits (undulating Taylor's swimming and jelly fish swimming), and climbing a meniscus.

Preferably, the MMR 100 includes two identical buoyant components 430 coupled to the two ends of the deformable component 420, each buoyant component 430 being disposed at a respective end 424 of the deformable component 420. Although each of the buoyant component 430 is illustrated as being wider and thicker than the deformable component 420, the respective dimensions of the buoyant components and the deformable component are not limited to such and may be varied. In some applications, the MMR 100 may not include the buoyant components. In some applications, the MMR 100 may have a differently shaped deformable component.

The deformable component 420 may be formed by molding a polymer matrix in which magnets are distributed. Hard magnetic microparticles, such as but not limited to a plurality of neodymium magnets (NdFeB), may be embedded in a polymer matrix, such as but not limited to Ecoflex 00-10. The polymer may be cured in an oven.

Another exemplary method of magnetizing the deformable component 420 is shown schematically in FIGS. 11A-11C. The deformable component 420 may have a default state in which it is characterized by a straight profile (FIG. 11A). The deformable component 420 is rolled up using a jig 490 and the two ends 424 of the deformable component 420 are brought near one another in the rolled-up state (FIG. 11B). A strong, uniform magnetic field $\vec{B}$ is applied to the deformable component 420 in the rolled-up state such that the magnetic field is substantially parallel to a gap between the free ends, as exaggerated in FIG. 11B to aid understanding. When the deformable component 420 is returned to its default state (i.e., not in the rolled-up state) the magnetic field vectors in the magnetized deformable component 420 are parallel to the end surfaces of the free ends 424 (i.e., the magnetized beam is characterized by a harmonic magnetization profile with a phase shift angle ($\varphi$) of $-90°$), as schematically illustrated in FIG. 11C.

The sixth-DOF torque (about the net magnetic moment axis 406) of the MMR 100/400 is estimated to be about 1.41 to 63.9 times larger than the torque of conventional five-DOF miniature robots. The magnitude of the achievable net magnetic moment ($\vec{m}$) of the MMR 100/400 is comparable or about the same as that of conventional five-DOF miniature robots. In other words, the present MMR 100/400 is capable of providing a useful sixth-DOF torque without compromising actuation capabilities in the other five DOFs.

Method of Actuation

A deformation mechanism of the proposed soft-bodied MMR 400, with a deformable component 420 as described above, is schematically illustrated in FIGS. 12A-12C. When a magnetic field, $\vec{B}$, is applied along a positive $z_{\{M\}}$-axis, the MMR can deform or flex and thereby assume a "U"-shaped configuration [FIG. 12A(i)]. In this deformed state, the MMR possesses a net magnetic moment $\vec{m}$ that is parallel to the actuating magnetic field $\vec{B}$. Conversely, the MMR may assume an inverted 'V'-shaped configuration when the direction of the actuating magnetic field $\vec{B}$ is reversed [FIG. 12A(ii)]. In the inverted 'V'-shaped configuration, the $\vec{m}$ of the MMR will be along the negative $z_{\{M\}}$-axis, parallel to the actuating magnetic field $\vec{B}$. The curvature or the degree of bending of the MMR can be controlled by adjusting the magnitude of the actuating magnetic field $\vec{B}$. For example, the MMR can be deformed or flexed to obtain a sharper curvature or more bending by increasing the magnitude of the actuating magnetic field (FIG. 12B). For example, a gentler curvature or a less bent state of the MMR can be obtained by decreasing the magnitude of the actuating magnetic field $\vec{B}$ (FIG. 12C).

Figure 13A:
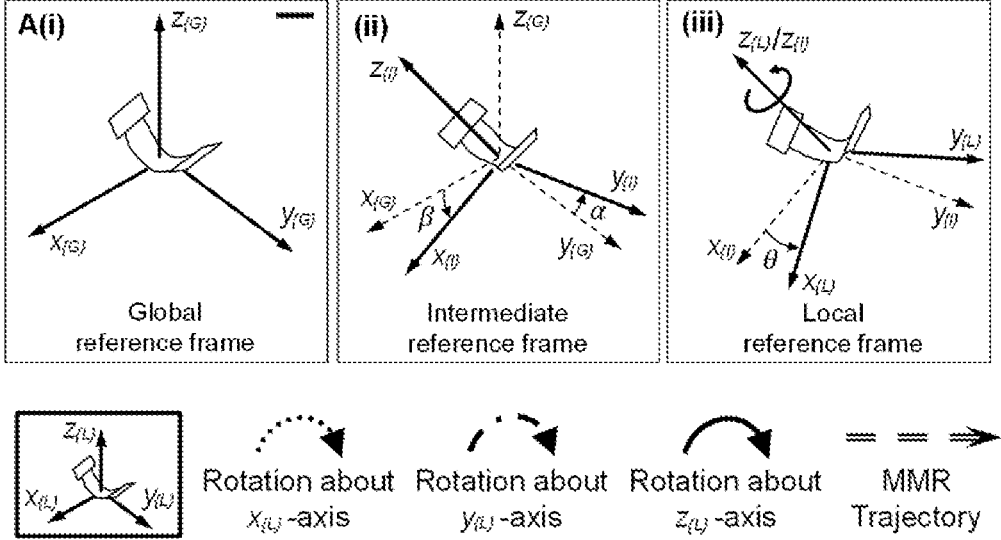
FIG. 13A show the frames of reference used in the present disclosure for describing the MMR with the deformable main component.
Figure 13B:
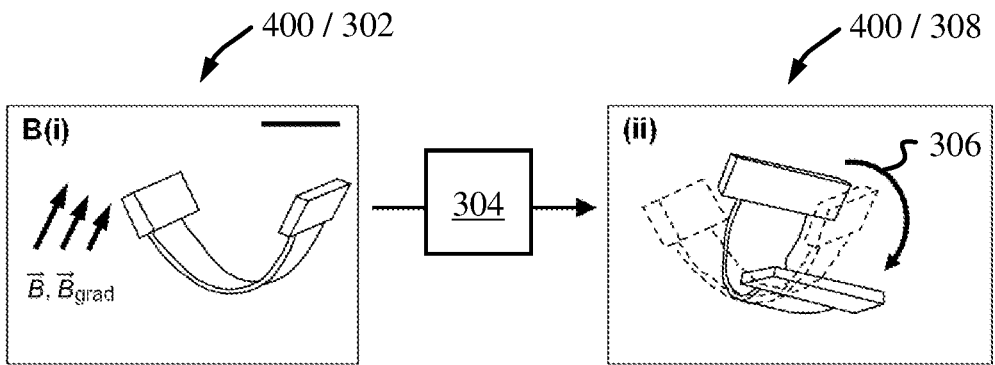
FIG. 13B are schematic drawings illustrating a method of actuating the MMR with the deformable main component.

The actuation and/or orientation of the present MMR 400 may be described with reference to the spatial reference frames as illustrated in FIGS. 13A-13B. FIG. 13A(i) illustrates the global reference frame with the respective axes denoted by the subscript {G}. FIG. 13A(ii) illustrates an intermediate reference frame in which the respective axes are denoted by the subscript {I}. FIG. 13(A)(iii) illustrates a local reference frame in which the respective axes are denoted by the subscript {L}. For convenience, it is assumed that the sixth-DOF axis is parallel to one of the principal axes in the local reference frame. In FIG. 13A(iii), the sixth-DOF axis is assumed to be parallel to the $z_{\{L\}}$-axis.

FIG. 13B(i) and FIG. 13B(ii) illustrate a method of actuating the present MMR 400. According to one embodiment, the proposed method includes control $\vec{B}$ and its independent spatial gradients, $\vec{B}_{grad}$, so that a desired orientation of the MMR becomes a minimum potential energy configuration. Under the influence of these actuating magnetic signals, the deformed MMR will constantly experience three axes of restoring torques until it self-aligns to the desired orientation. The presence of the restoring torques will also help the present MMR 400 to reject external disturbances, enabling the MMR to maintain the desired orientation. When the MMR 400 is in a state of rotational equilibrium at the desired orientation, a force $\vec{F}_{\{I\}}$ can applied to the MMR. Based on the desired $\vec{F}_{\{I\}}$, the magnetic actuating signals for implementing six-DOF control can be derived by solving Equation (10):

$$
\begin{pmatrix} \vec{B}_{\{I\}} \\ \vec{B}_{grad,\{I\}} \end{pmatrix} = C^T\left[CC^T\right]^{-1}\begin{pmatrix} \vec{0}_{3\times1,\{I\}} \\ \vec{F}_{desired,\{I\}} \end{pmatrix} + k_1\begin{pmatrix} 0 \\ 0 \\ 1 \\ 0 \\ 0 \\ 0 \\ 0 \\ 0 \end{pmatrix}_{\{I\}} + k_2\begin{pmatrix} 0 \\ 0 \\ 0 \\ 0 \\ 0 \\ 0 \\ 1 \\ -\tan(2\theta) \end{pmatrix}_{\{I\}}
\tag{10}
$$

where, $$
C(\theta) = \begin{pmatrix} R_z(\theta) & 0_{3\times3} \\ 0_{3\times3} & R_z(\theta) \end{pmatrix}DA,
$$

$$
R_z(\theta) = \begin{pmatrix} \cos\theta & -\sin\theta & 0 \\ \sin\theta & \cos\theta & 0 \\ 0 & 0 & 1 \end{pmatrix},
$$

$$
D = \begin{bmatrix} 0 & -|\vec{m}| & 0 & 0 & d_1 & 0 & 0 & 0 \\ |\vec{m}| & 0 & 0 & d_2 & 0 & 0 & 0 & 0 \\ 0 & 0 & 0 & 0 & 0 & 0 & 0 & d_3 \\ 0 & 0 & 0 & |\vec{m}| & 0 & 0 & 0 & 0 \\ 0 & 0 & 0 & 0 & |\vec{m}| & 0 & 0 & 0 \\ 0 & 0 & 0 & 0 & 0 & |\vec{m}| & 0 & 0 \end{bmatrix},
$$

$$
A = \begin{bmatrix} \cos\theta & \sin\theta & 0 & 0 & 0 & 0 & 0 & 0 \\ -\sin\theta & \cos\theta & 0 & 0 & 0 & 0 & 0 & 0 \\ 0 & 0 & 1 & 0 & 0 & 0 & 0 & 0 \\ 0 & 0 & 0 & \cos\theta & \sin\theta & 0 & 0 & 0 \\ 0 & 0 & 0 & -\sin\theta & \cos\theta & 0 & 0 & 0 \\ 0 & 0 & 0 & 0 & 0 & 1 & 0 & 0 \\ 0 & 0 & 0 & 0 & 0 & -\sin^2\theta & \cos2\theta & -\sin2\theta \\ 0 & 0 & 0 & 0 & 0 & 0.5\sin2\theta & \sin2\theta & \cos2\theta \end{bmatrix},
$$

and where $$
d_1 = \int\int\int (r_yM_y - r_zM_z)dV,
$$

$$
d_2 = \int\int\int r_zM_z dV,
$$

$$
d_3 = \int\int\int -r_yM_y dV.
$$

The variables, $r_y$ and $r_z$, represent the Cartesian y- and z-axes components of $$
\vec{r}_{\{L\}}.
$$

Likewise, the variables, $M_y$ and $M_z$, represent the Cartesian y- and z-axes components of $$
R_x(\gamma)\vec{M}_{\{M\}}.
$$

The D matrix (the design matrix) is characterized by a full rank. The control matrix $C(\theta)$ is also a full rank matrix. The variables, $k_1$ and $k_2$, are the scale factors for the null space vectors.

The actuating magnetic field is selected or configured so that the MMR 400 will be in a rotational equilibrium state when it reaches the desired orientation, at which time a desired force $\vec{F}_{\{I\}}$ is applied to the MMR.

The first null space vector, $$(0 \; 0 \; 1 \; 0 \; 0 \; 0 \; 0 \; 0)_{\{I\}}^T,$$

generates two axes of restoring torques for the MMR 400, without providing a restoring torque about the sixth-DOF axis. By adjusting the magnetic actuating signals via the second null space vector, a restoring torque about the sixth-DOF axis of the MMR 400 is provided, which will in turn allow the MMR's sixth-DOF angular displacement to self-align the MMR into the desired orientation (desired $\theta$) and subsequently maintain the desired orientation or desired angle $\theta$.

The magnetic actuating signals in Equation (10) may be computed based on the highest permissible magnitudes of $k_1$ and $k_2$. Once the values of $k_1$ and $k_2$ are determined, the actuating signals may be mapped to the global reference frame:

Preferably, the required actuating signals (based on the global reference frame) are specified such that the desired orientation of the MMR 400 corresponds to a configuration of minimum potential energy. Based on this actuation method, MMRs can also be controlled to follow a given angular trajectory. One exemplary method involves discretizing the trajectory into a sequence of angular displacements and sequentially make each of all of these orientations into a minimum potential energy configuration. As the present MMR is capable of full six-DOF motions, the desired magnetic forces can also be applied on the MMR at any point along the angular trajectory. Together with controlling the time-varying deformations of the MMR, such six-DOF control enable multiple modes of soft-bodied locomotion to be executed with precise orientation control.

The following describes experiments conducted using prototypes of the present MMR 400 controlled by the actuation method described above, with the aid of line drawing representations of images captured from video recordings of the experiments.

Rolling

The experiments verified that embodiments of the present MMR 400 is capable of rolling (one of the fastest modes of terrestrial locomotion) as one of the many possible modes of locomotion, in which the rolling locomotion is controllable in six DOF by the actuation method described above.

Responsive to a magnetic field $$\vec{B}$$

of 13 mT applied along the positive $z_{\{L\}}$-axis of the MMR, the main component of the present MMR deformed such that the MMR forms an initial configuration to possess an effective magnetic moment $$\vec{m}$$

favorable to rolling (such as a 'U'-shaped configuration as shown in FIG. 14A. Thereafter, responsive to a continuous rotation of the actuating magnetic field in the $y_{\{L\}}z_{\{L\}}$ plane or the $z_{\{L\}}x_{\{L\}}$ plane, the MMR demonstrated rolling along its length (rotating about the $x_{\{L\}}$-axis) as shown in FIG. 14A(i) or along its width (rotating about the $y_{\{L\}}$-axis) as shown in FIG. 14A(ii). In the experiments, the magnitude of the actuating magnetic field $$|\vec{B}| = 13 \; mT,$$

but it will be understood that magnetic fields of various other magnitudes may be applied. The rolling direction of the MMR may also be steered by controlling its angular displacement about the $$\vec{B}_{grad}.$$

FIGS. 14B(i)-14(B)(iv) are line drawing representations of the MMR captured as a time series of images as the MMR undergoes angular displacement about the $z_{\{L\}}$-axis or the sixth-DOF axis.

Rolling along the length of the MMR 400 would be faster than rolling along the width since the length of the MMR is longer than the width, assuming that the rotating frequencies of the actuating magnetic field $$\vec{B}$$

are identical for both rolling scenarios. Despite being slower, rolling along the width of the MMR can be useful in some cases, e.g., the curvatures of the deformed MMR main component can be gentler, resulting in an overall flatter shape so that the MMR can potentially squeeze through smaller openings.

Having the options to execute different modes of rolling makes the MMR 400 more robust as an actuator, i.e., more ready to cope with different terrains and/or obstacles. On obstacle-free terrains, the MMR may be configured to roll quickly along its length. In one non-limiting example, a prototype of the present MMR could roll along its length at a speed of 2.46 mm s$^{-1}$ in a 0.25 Hz rotating magnetic field $$\vec{B}.$$

Alternatively, the MMR may be configured to roll along its width if it has to negotiate across barriers with narrow openings in the environment. In another non-limiting example, a prototype of the present MMR could roll along its width at a speed of 1.85 mm s$^{-1}$ in a 0.25 Hz rotating magnetic field $$\vec{B}.$$

To demonstrate the remaining DOF of the present MMR 400, the prototype MMR was made to translate along each of its three principal axes in the local reference frame. Before executing each of these translations, a magnetic field $$\vec{B}$$

was applied along the $z_{\{L\}}$-axis of the MMR so that the deformable component 420 of the MMR could deform into a 'U'-shaped configuration to possess an effective $$\vec{m}.$$

A corresponding $$\vec{B}_{grad}$$

was then applied to exert the desired magnetic forces on the MMR to translate it along the $x_{\{L\}}$-axis [FIG. 14(C)(i)], the $y_{\{L\}}$-axis [FIG. 14(C)(ii)], and the $z_{\{L\}}$-axes [FIG. 14(C)(iii)]. The experiments also confirmed that the rotational motion about any of the three axes and the translational motion of the present MMR along any of the three axes may be fully decoupled from one another, i.e., the present MMR is able to attain full six-DOF control. This could be advantageously used to enhance the efficiency of locomotion. For example, upwardly directed forces may be applied on the MMR to reduce its friction with the ground, making it easier to jump higher or swim against gravity, while forces in other directions may be applied on the MMR to effect its translation and/or rotation towards a target destination.

Two-Anchor Crawling

It was experimentally verified that the present MMR 400 is capable of executing another mode of locomotion referred to as a two-anchor crawling locomotion, in which the locomotion is controllable in six DOF by the actuation method described above.

To implement the two-anchor locomotion, the MMR is made to assume a "U"-shaped configuration with the two ends of the MMR contact the substrate (i.e., the terrestrial surface). Referring to the time series images of FIG. 15A, the dashed line in FIGS. 15A(i) and 15A(v) represents an initial location of a "rear" end of the MMR, and the solid line in FIG. 15A(v) represents a final location of the same end of the MMR, after the MMR performed one "cycle" of a two-anchor crawl. The distance between the dashed line and the solid line represents a net displacement of the MMR in one cycle. The MMR may be controlled to repeat the cycle [FIGS. 15A(i)-15A(v)]. The two-anchor locomotion may be described as a cyclic locomotion.

The actuation method proposed herein is also useful for enabling the two-anchor locomotion up an inclined surface or a slope. For example, the angular displacement about the $x_{\{L\}}$-axis may be controlled to enable the MMR to ascent an inclined slope of about 20°, as illustrated in FIG. 15B.

In another experiment, a prototype of the present MMR 400 was made to navigate a narrow passageway which imposes different shape constraints at different parts of the passageway. As illustrated by FIG. 15C, the same MMR was able to adopt various shapes at different times to successfully traverse the passageway. For example, the MMR could be precisely controlled in its angular displacement about the $y_{\{L\}}$-axis to crawl under an overhanging obstacle. For example, the MMR could be precisely controlled in sixth-DOF angular displacement about the $z_{\{L\}}$-axis, so that it could execute a sharp turn at a junction or a corner of a confined "L"-shaped passageway.

Undulating Crawling

Figure 16A:
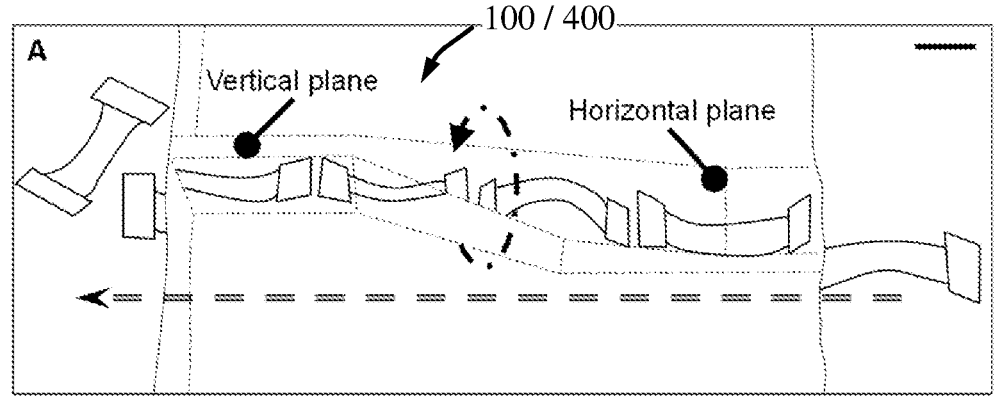
FIGS. 16A-16B are line drawing representations of images captured of the MMR demonstrating an undulating crawling locomotion.

It was experimentally verified that the present MMR 400 is capable of executing another mode of locomotion referred to as an undulating crawling locomotion, in which the locomotion is controllable in six DOF by the actuation method described above. The main component of the MMR may exhibit a traveling wave of bending and unbending along its length, such that the MMR inches "forward" along the $y_{\{L\}}$-axis, for example. In the experiments, a prototype of the MMR successfully negotiated its way through a complex channel involving movement across two perpendicular planes (FIG. 16A). This involved controlling the angular displacement of the MMR about the $y_{\{L\}}$-axis, in addition to controlling its undulating crawl.

Figure 16B:
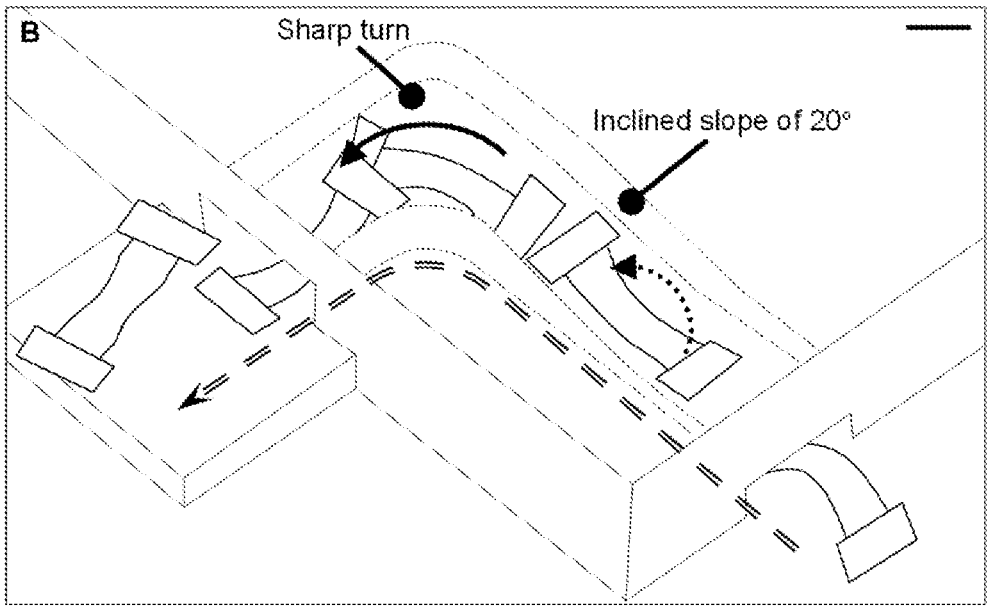

In another experiment, the present MMR 400 successfully executed undulating crawling to ascend an inclined slope of about 20° by controlling the angular displacement of the MMR about the $x_{\{L\}}$-axis. By rotating about its $z_{\{L\}}$-axis, the MMR could perform a sharp turn at a junction or a corner of the confined "L"-shaped channel (FIG. 16B).

Jumping

FIG. 17A are line drawing representations of images captured at different times of a prototype of the present MMR 400 executing a jumping locomotion. This was effected by controlling the angular displacements of the MMR about the $z_{\{L\}}$-axis and the $x_{\{L\}}$-axis. In another experiment, the same MMR was controlled to produce angular displacements about the $z_{\{L\}}$-axis and the $y_{\{L\}}$-axis. As shown in FIG. 17B, the MMR could execute a different variation of the jumping locomotion. The MMR was similarly oriented in the beginning of both jumps, and yet was able to exhibit different shapes and orientation during the jumps and upon completing the jumps.

Jellyfish-Like Swimming

It was experimentally verified that the present MMR 400 is capable of executing two different modes of swimming locomotion, in which the locomotion is controllable in six DOF by the actuation method described above. FIGS. 18A-18C are line drawing representations of a prototype of the present MMR, showing the MMR moving in water. In the experiment of FIG. 18A, the angular displacement of the MMR about its $x_{\{L\}}$-axis was controlled to steer the swimming direction or the overall trajectory of the MMR in water. In the experiment of FIG. 18(B), the same MMR could be steered along a different trajectory or swimming direction by controlling its angular displacement about the $y_{\{L\}}$-axis. In the experiment of FIG. 18C, the MMR was continuously rotated about its sixth-DOF axis, herein corresponding to as the $z_{\{L\}}$-axis as it executed the swimming locomotion.

Undulating Swimming

The present MMR 400 can be controlled to execute an undulating swimming locomotion by continuously generating a traveling wave along the length of the main component, as shown in FIGS. 19A(ii)-19A(vi). The net displacement of the MMR after one period (or one cycle) of the traveling wave can be seen from comparing FIGS. 19A(ii) and 19(v). Additionally, and concurrently, the MMR may be steered to follow an "L"-shaped trajectory using the actuation method described above.

Meniscus-Climbing

It was further experimentally verified that the present MMR 400 is capable of a mode of aquatic locomotion referred to as meniscus-climbing. As illustrated by the time series images of FIG. 19C, a strong upward magnetic field $\vec{B}$ (for example, but not limited to, $|\vec{B}|$=25 mT) was applied to deform the MMR. Next, the actuating magnetic field $\vec{B}$ is rotated to rotate the MMR. In this non-limiting example, the rotation is from 30° [FIG. 19C(iii)] to 60° [FIG. 19C(iv)], with respect to the vertical upright direction.

Multimodal Amphibious Locomotion

Any one or more of the various modes of locomotion may be selected and combined to successfully navigate the MMR 400 through various unstructured environments with complex barriers. This was experimentally verified using a variety of synthetic obstacle courses as shown in FIGS. 20A-20D.

FIG. 20A shows the MMR 400 in an unstructured terrestrial environment, jumping to get from a lower elevation to a higher elevation. The orientation of the MMR was controlled concurrently with the execution of the jumping locomotion so that the MMR could jump through a narrow slot via precisely controlling its orientation. Subsequently, the MMR rolled along its width with a gentle curvature to squeeze through a first opening in a first wall. Next, the MMR rolled along its length to pass through a second opening in a second wall. The MMR was therefore able to roll at a faster speed (rolling lengthwise) if the size and orientation of the opening permits, and also able to roll with a lower profile (rolling widthwise) if the size and orientation of the opening imposed such constraints.

The jumping locomotion of the MMR in FIG. 20A is shown in greater detail in FIG. 20B, i.e., with line drawing representations of the MMR in various frames captured from a slow motion video. It is evident that, in the experiment, the sides of the narrow slot would have blocked the MMR from jumping therethrough if the MMR had maintained the same orientation throughout the jump. The present MMR is controllable in the six-DOF such that the jumping locomotion could be performed concurrently with a twist or rotation to change the orientation of the MMR, enabling the MMR to pass through the slow which is only slightly wider than the width of the MMR.

FIG. 20C shows another unstructured terrestrial environment that present a variety of obstacles. The MMR was first commanded to perform a two-anchor crawl so that it could travel along a path constrained on either side and subsequently climb up a stair-like structure. The two-anchor crawl also enabled the MMR to bridge itself across a gap without falling into a ravine-like trap. The MMR was able to change its mode of locomotion to better navigate the next part of the environment. In this example, the MMR changed from the two-anchor crawl to an undulating crawl to negotiate a confined and enclosed channel having convoluted geometries. In the experiment, the MMR successfully ascended an upslope of about 10° and performed a sharp turn at the junction of an "L"-shaped channel. The MMR then had to transition from crawling on a "floor" to crawling on a "wall" as the cross-sectional width of the channel changed from being wider than the width of the MMR to being narrower than the width of the MMR.

FIG. 20D shows an experiment in which the MMR moved in a hybrid aquatic-terrestrial environment. The MMR first performed a jellyfish-like swimming locomotion with precise orientation control to bypass a barrier and then rolled across an air-water interface to transit from water to land.

Pick-and-Place Operations

Figure 21A:
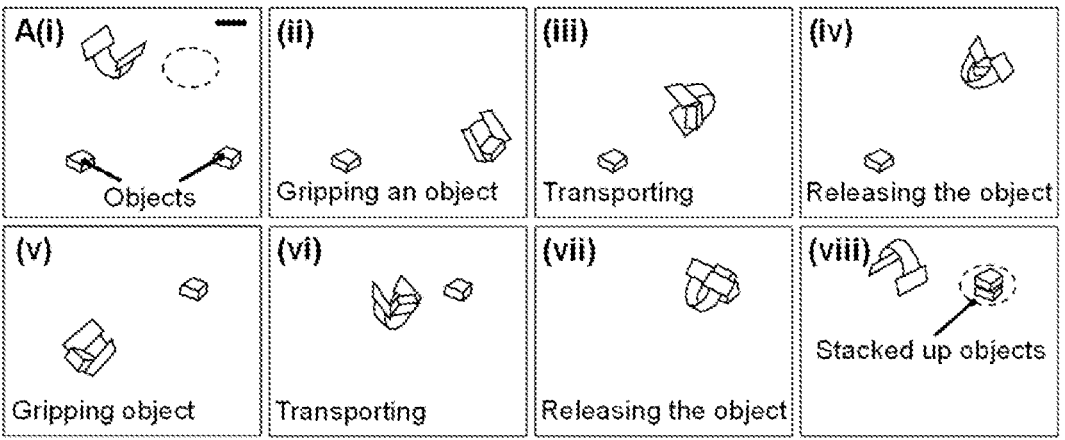
FIGS. 21A-21B are line drawing representations of images captured of the MMR demonstrating various pick-and-place processes.

It was experimentally verified that the present MMR 400 was strong enough to perform pick-and-place operations. FIGS. 21A(i)-21A(viii) are line drawing representations of images captured from a video recording of the MMR collecting, transporting, and stacking objects at a target placement location indicated by a dotted ellipse in FIG. 21A(i). FIG. 21A(ii) shows the MMR in a rolling locomotion traveling towards a first object and gripping or grabbing the first object between the two ends of the MMR. FIG. 21A(iii) shows the MMR holding the first object while concurrently moving towards the target placement location. FIG. 21A(iv) shows the MMR releasing the first object at the target placement location. FIG. 21A(v) shows the MMR repeating the same process of gripping or grabbing for a second object. FIG. 21A(vi) shows the transporting the second objecting towards a target placement location for the second object. In this experiment, the target placement location for the second object is on top of the first object. FIG. 21A(vii) shows the MMR releasing the second object above the first object, so that the second object could be stacked on top of the first object.

Figure 21B:

FIGS. 21B(i)-21B(v) show stages of an experiment in which the MMR successfully picked up [FIGS. 21B(i)-21B(ii)], transported [FIGS. 21B(iii)-21B(iv)], and placed an object in a target placement location [FIG. 21B(v)]. In the experiment, the weight of the object (payload) is about or at least three times the weight of the MMR. Thus, it has been experimentally verified that the present MMR and the actuation method therefor are suitable for many practical applications involving pick-and-place processes.

All examples described herein, whether of apparatus, methods, materials, or products, are presented for the purpose of illustration and to aid understanding, and are not intended to be limiting or exhaustive. Various changes and modifications may be made by one of ordinary skill in the art without departing from the scope of the invention as claimed.

The invention claimed is:

1. A method of making a magnetic miniature robot (MMR), the method comprising:

rotationally deforming a segment of material about a rotational deformation axis, from an initial shape to a deformed shape, the material including a plurality of magnetic particles distributed in an elastic matrix;

magnetizing the plurality of magnetic particles in the segment in a magnetization process to form a magnetized segment, in the magnetized segment in the deformed shape being characterized by a uniform magnetization profile;

after the magnetization process, enabling the magnetized segment to elastically recover the initial shape and form a non-uniform magnetization profile; and coupling together at least one pair of the segments to form a main component, wherein the non-uniform magnetization profiles of the at least one pair of the segment are disposed in opposing orientations to configure the main component with a zero net magnetic moment about a sixth degree-of-freedom (DOF) axis;

coupling an auxiliary magnet to the main component, the auxiliary magnet being characterized by a uniform magnetization profile, wherein the segment is bounded by a first surface and a second surface, and wherein the rotationally deforming comprises angularly displacing the second surface relative to the first surface, and wherein the initial shape defines either 1) a quadrant cross-section, in which case the deformed shape includes a semicircular cross-section or 2) a semicircular cross-section, in which case the deformed shape includes a circular cross-section.

2. The method of claim 1, wherein the auxiliary magnet and the main component are coupled in alignment along the sixth DOF axis, and wherein a non-zero net magnetic moment of the auxiliary magnet coincides the sixth DOF axis.

3. The method of claim 1, wherein the rotationally deforming of the segment comprises providing an angular displacement of the second surface relative to the first surface until the second surface is parallel or anti-parallel with the first surface.

4. The method of claim 1, wherein the rotationally deforming of the segment comprises stretching the segment with the material along a radial line undergoing a similar angular displacement, the radial line being defined as extending from the rotational deformation axis.

5. The method of claim 4, further comprising: cutting out a piece from a center of an assembly to form the main component.

6. The method of claim 1, wherein the initial shape defines the quadrant cross-section, and wherein the deformed shape comprises the semicircular cross-section.

7. The method of claim 1, wherein the initial shape defines the semicircular cross-section, and wherein the deformed shape comprises the circular cross-section.

8. The method of claim 1, further comprising:
prior to the rotationally deforming, distributing the plurality of magnetic particles in the elastic matrix to form the material;
molding the material into the initial shape; and
curing the material.

9. The method of claim 1, wherein the MMR is configured to enable a sixth DOF restoring torque.

\* \* \* \* \*